United States Patent
Lee et al.

(10) Patent No.: US 10,839,585 B2
(45) Date of Patent: Nov. 17, 2020

(54) 4D HOLOGRAM: REAL-TIME REMOTE AVATAR CREATION AND ANIMATION CONTROL

(71) Applicant: VanGogh Imaging, Inc., McLean, VA (US)

(72) Inventors: Ken Lee, Fairfax, VA (US); Xiang Zhang, McLean, VA (US); Xin Hou, Herndon, VA (US)

(73) Assignee: VanGogh Imaging, Inc., McLean, VA (US)

( * ) Notice: Subject to any disclaimer, the term of this patent is extended or adjusted under 35 U.S.C. 154(b) by 0 days.

(21) Appl. No.: 16/240,404

(22) Filed: Jan. 4, 2019

(65) Prior Publication Data
US 2019/0213773 A1 Jul. 11, 2019

Related U.S. Application Data

(60) Provisional application No. 62/614,201, filed on Jan. 5, 2018, provisional application No. 62/637,885, filed
(Continued)

(51) Int. Cl.
*G06T 13/40* (2011.01)
*G06K 9/00* (2006.01)
(Continued)

(52) U.S. Cl.
CPC .......... *G06T 13/40* (2013.01); *G06K 9/00248* (2013.01); *G06T 7/70* (2017.01);
(Continued)

(58) Field of Classification Search
CPC ......... G06T 13/40; G06T 7/70; G06T 15/005; G06T 17/00; G06T 17/20; G06K 9/00248; H04L 67/38
See application file for complete search history.

(56) References Cited

U.S. PATENT DOCUMENTS 5,675,326 A    10/1997    Juds et al.
6,259,815 B1    7/2001    Anderson et al.
(Continued)

FOREIGN PATENT DOCUMENTS

EP          1308902 A2    5/2003
KR       10-1054736 B1    8/2011
(Continued)

OTHER PUBLICATIONS

Rossignac, J. et al., "3D Compression Made Simple: Edgebreaker on a Corner-Table," Invited lecture at the Shape Modeling International Conference, Genoa, Italy (Jan. 30, 2001), pp. 1-6.
(Continued)

*Primary Examiner* — Chong Wu
(74) *Attorney, Agent, or Firm* — Proskauer Rose LLP

(57) ABSTRACT

Described are methods and systems for real-time remote avatar creation and animation control. A sensor device captures images of non-rigid objects in a scene. A server coupled to the sensor device generates an initial 3D model for each of the non-rigid objects in the scene using the images. The server detects landmark points on the non-rigid objects using the initial 3D model. The server generates a control point animation map for the 3D model using the detected points. The server applies the animation map to the 3D model to generate a mapped 3D model. A viewer coupled to the server receives (i) the mapped 3D model and (ii) tracking information associated with the objects, including a model pose and deformation of the landmark points. The viewer modifies the mapped 3D model using the tracking information, and renders a video stream on the viewer using the modified 3D model.

36 Claims, 22 Drawing Sheets

Related U.S. Application Data on Mar. 2, 2018, provisional application No. 62/658,338, filed on Apr. 16, 2018.

(51) Int. Cl.
| | |
|---|---|
| G06T 15/00 | (2011.01) |
| H04L 29/06 | (2006.01) |
| G06T 7/70 | (2017.01) |
| G06T 17/20 | (2006.01) |
| G06T 17/00 | (2006.01) |

(52) U.S. Cl.
CPC .......... *G06T 15/005* (2013.01); *G06T 17/00* (2013.01); *G06T 17/20* (2013.01); *H04L 67/38* (2013.01)

(56) References Cited

U.S. PATENT DOCUMENTS

| | | |
|---|---|---|
| 6,275,235 B1 | 8/2001 | Morgan, III |
| 6,525,722 B1 | 2/2003 | Deering |
| 6,525,725 B1 | 2/2003 | Deering |
| 7,248,257 B2 | 7/2007 | Elber |
| 7,420,555 B1 | 9/2008 | Lee |
| 7,657,081 B2 | 2/2010 | Blais et al. |
| 8,209,144 B1 | 6/2012 | Anguelov et al. |
| 8,542,233 B2 | 9/2013 | Brown |
| 8,766,979 B2 | 7/2014 | Lee et al. |
| 8,942,917 B2 | 1/2015 | Chrysanthakopoulos |
| 8,995,756 B2 | 3/2015 | Lee et al. |
| 9,041,711 B1 | 5/2015 | Hsu |
| 9,104,908 B1* | 8/2015 | Rogers ............... G06K 9/00315 |
| 9,171,402 B1 | 10/2015 | Allen et al. |
| 9,607,388 B2 | 5/2017 | Lin et al. |
| 9,710,960 B2 | 7/2017 | Hou |
| 9,886,530 B2 | 2/2018 | Mehr et al. |
| 9,978,177 B2 | 5/2018 | Mehr et al. |
| 2005/0068317 A1 | 3/2005 | Amakai |
| 2005/0128201 A1 | 6/2005 | Warner et al. |
| 2005/0253924 A1 | 11/2005 | Mashitani |
| 2006/0050952 A1 | 3/2006 | Blais et al. |
| 2006/0170695 A1 | 8/2006 | Zhou et al. |
| 2006/0277454 A1 | 12/2006 | Chen |
| 2007/0075997 A1 | 4/2007 | Rohaly et al. |
| 2008/0180448 A1 | 7/2008 | Anguelov et al. |
| 2008/0291278 A1* | 11/2008 | Zhang ............... G06K 9/00771 348/159 |
| 2008/0310757 A1 | 12/2008 | Wolberg et al. |
| 2009/0232353 A1 | 9/2009 | Sundaresan et al. |
| 2010/0111370 A1 | 5/2010 | Black et al. |
| 2010/0198526 A1 | 8/2010 | Plewe |
| 2010/0209013 A1 | 8/2010 | Minear et al. |
| 2010/0302247 A1 | 12/2010 | Perez et al. |
| 2011/0052043 A1 | 3/2011 | Hyung et al. |
| 2011/0074929 A1 | 3/2011 | Hebert et al. |
| 2012/0056800 A1 | 3/2012 | Williams et al. |
| 2012/0063672 A1 | 3/2012 | Gordon et al. |
| 2012/0098937 A1 | 4/2012 | Sajadi et al. |
| 2012/0130762 A1 | 5/2012 | Gale et al. |
| 2012/0194516 A1 | 8/2012 | Newcombe et al. |
| 2012/0306876 A1 | 12/2012 | Shotton et al. |
| 2013/0069940 A1 | 3/2013 | Sun et al. |
| 2013/0123801 A1 | 5/2013 | Umasuthan et al. |
| 2013/0156262 A1 | 6/2013 | Taguchi et al. |
| 2013/0201104 A1 | 8/2013 | Ptucha et al. |
| 2013/0201105 A1 | 8/2013 | Ptucha et al. |
| 2013/0208955 A1 | 8/2013 | Zhao et al. |
| 2013/0226528 A1 | 8/2013 | Hodgins et al. |
| 2014/0160115 A1 | 6/2014 | Keitler et al. |
| 2014/0176677 A1 | 6/2014 | Valkenburg et al. |
| 2014/0206443 A1 | 7/2014 | Sharp et al. |
| 2014/0240464 A1 | 8/2014 | Lee |
| 2014/0241617 A1 | 8/2014 | Shotton et al. |
| 2014/0270484 A1 | 9/2014 | Chandraker et al. |
| 2014/0321702 A1 | 10/2014 | Schmalstieg |
| 2015/0009214 A1 | 1/2015 | Lee et al. |
| 2015/0045923 A1 | 2/2015 | Chang et al. |
| 2015/0142394 A1 | 5/2015 | Mehr et al. |
| 2015/0213572 A1 | 7/2015 | Loss |
| 2015/0234477 A1 | 8/2015 | Abovitz et al. |
| 2015/0262405 A1 | 9/2015 | Black et al. |
| 2015/0269715 A1 | 9/2015 | Jeong et al. |
| 2015/0279118 A1 | 10/2015 | Dou et al. |
| 2015/0301592 A1 | 10/2015 | Miller |
| 2015/0325044 A1 | 11/2015 | Lebovitz |
| 2015/0371440 A1 | 12/2015 | Pirchheim et al. |
| 2016/0026253 A1 | 1/2016 | Bradski et al. |
| 2016/0071318 A1 | 3/2016 | Lee et al. |
| 2016/0171765 A1 | 6/2016 | Mehr |
| 2016/0173842 A1 | 6/2016 | De La Cruz et al. |
| 2016/0358382 A1 | 12/2016 | Lee et al. |
| 2017/0053447 A1 | 2/2017 | Chen et al. |
| 2017/0054954 A1 | 2/2017 | Keitler et al. |
| 2017/0054965 A1 | 2/2017 | Raab et al. |
| 2017/0069124 A1* | 3/2017 | Tong ..................... G06T 13/40 |
| 2017/0221263 A1 | 8/2017 | Wei et al. |
| 2017/0243397 A1 | 8/2017 | Hou et al. |
| 2017/0278293 A1 | 9/2017 | Hsu |
| 2017/0316597 A1 | 11/2017 | Ceylan et al. |
| 2017/0337726 A1 | 11/2017 | Bui et al. |
| 2017/0372505 A1* | 12/2017 | Bhat ..................... G06T 7/246 |
| 2018/0005015 A1 | 1/2018 | Hou et al. |
| 2018/0025529 A1 | 1/2018 | Wu et al. |
| 2018/0114363 A1 | 4/2018 | Rosenbaum |
| 2018/0144535 A1 | 5/2018 | Ford et al. |
| 2018/0300937 A1 | 10/2018 | Chien et al. |
| 2019/0244412 A1 | 8/2019 | Yago Vicente et al. |

FOREIGN PATENT DOCUMENTS

| | | |
|---|---|---|
| KR | 10-2011-0116671 A | 10/2011 |
| WO | 2006027339 A2 | 3/2006 |

OTHER PUBLICATIONS

Melax, S., "A Simple, Fast, and Effective Polygon Reduction Algorithm," Game Developer, Nov. 1998, pp. 44-49.

Myronenko, A. et al., "Point Set Registration: Coherent Point Drift," IEEE Transactions on Pattern Analysis and Machine Intelligence, vol. 32, No. 12, Dec. 2010, pp. 2262-2275.

Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.

Izadi, S. et al., "KinectFusion: Real-time 3D Reconstruction and Interaction Using a Moving Depth Camera," UIST '11, Oct. 16-19, 2011, 10 pages.

Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 8-12, 2010, 14 pages.

Biegelbauer, Georg et al., "Model-based 3D object detection—Efficient approach using superquadrics," Machine Vision and Applications, Jun. 2010, vol. 21, Issue 4, pp. 497-516.

Kanezaki, Asako et al., "High-speed 3D Object Recognition Using Additive Features in a Linear Subspace," 2010 IEEE International Conference on Robotics and Automation, Anchorage Convention District, May 3-8, 2010, pp. 3128-3134.

International Search Report and Written Opinion from PCT patent application No. PCT/US13/062292, dated Jan. 28, 2014, 10 pages.

International Search Report and Written Opinion from PCT patent application No. PCT/US14/045591, dated Nov. 5, 2014, 9 pages.

Sumner, R. et al., "Embedded Deformation for Shape Manipulation," Applied Geometry Group, ETH Zurich, SIGGRAPH 2007, 7 pages.

Rosten, Edward, et al., "Faster and better: a machine learning approach to corner detection," arXiv:08102.2434v1 [cs.CV], Oct. 14, 2008, available at https://arxiv.org/pdf/0810.2434.pdf, 35 pages.

Kim, Young Min, et al., "Guided Real-Time Scanning of Indoor Objects," Computer Graphics Forum, vol. 32, No. 7 (2013), 10 pages.

(56) References Cited

OTHER PUBLICATIONS

Rusinkewicz, Szymon, et al., "Real-time 3D model acquisition," ACM Transactions on Graphics (TOG) 21.3 (2002), pp. 438-446.
European Search Report from European patent application No. EP 15839160, dated Feb. 19, 2018, 8 pages.
Liu, Song, et al., "Creating Simplified 3D Models with High Quality Textures," arXiv:1602.06645v1 [cs.GR], Feb. 22, 2016, 9 pages.
Stoll, C., et al., "Template Deformation for Point Cloud Filtering," Eurographics Symposium on Point-Based Graphics (2006), 9 pages.
Allen, Brett, et al., "The space of human body shapes: reconstruction and parameterization from range scans," ACM Transactions on Graphics (TOG), vol. 22, Issue 3, Jul. 2003, pp. 587-594.
International Search Report and Written Opinion from PCT patent application No. PCT/US15/49175, dated Feb. 19, 2016, 14 pages.
Harris, Chris & Mike Stephens, "A Combined Corner and Edge Detector," Plessey Research Roke Manor, U.K. (1988), pp. 147-151.
Bay, Herbert, et al., "Speeded-Up Robust Features (SURF)," Computer Vision and Image Understanding 110 (2008), pp. 346-359.
Rublee, Ethan, et al., "ORB: an efficient alternative to SIFT or SURF," Willow Garage, Menlo Park, CA (2011), available from http://citeseerx.ist.psu.edu/viewdoc/download?doi=10.1.1.370.4395&rep=rep1&type=pdf, 8 pages.
Lowe, David G., "Distinctive Image Features from Scale-Invariant Keypoints," International Journal of Computer Vision, vol. 60, Issue 2, Nov. 2004, pp. 91-110.
Kaess, Michael, et al., "iSAM: Incremental Smoothing and Mapping," IEEE Transactions on Robotics, Manuscript, Sep. 7, 2008, 14 pages.
Kummerle, Rainer, et al., "g2o: A General Framework for Graph Optimization," 2011 IEEE International Conference on Robotics and Automation, May 9-13, 2011, Shanghai, China, 7 pages.

\* cited by examiner

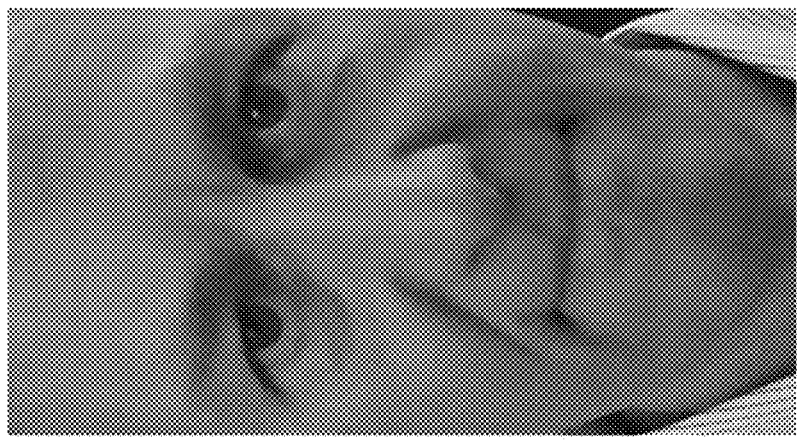
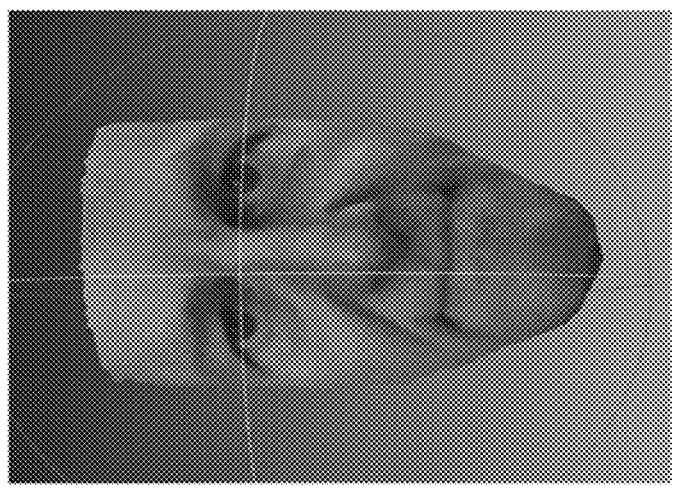
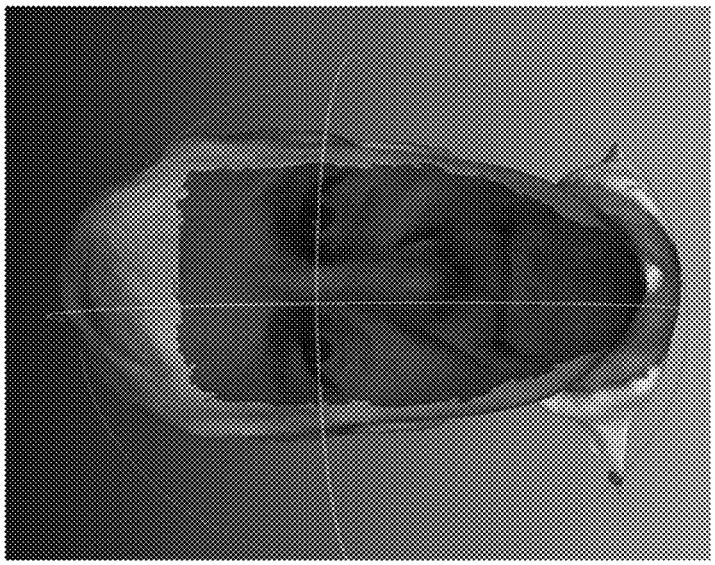
FIG. 6A

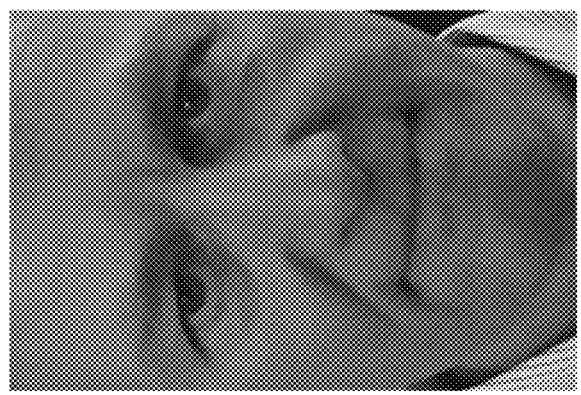
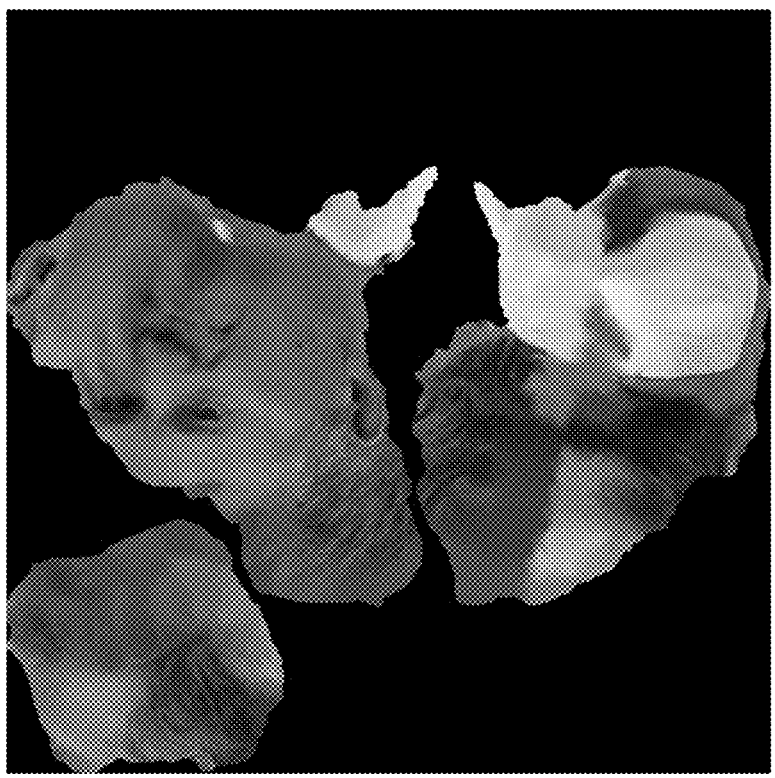
FIG. 6B

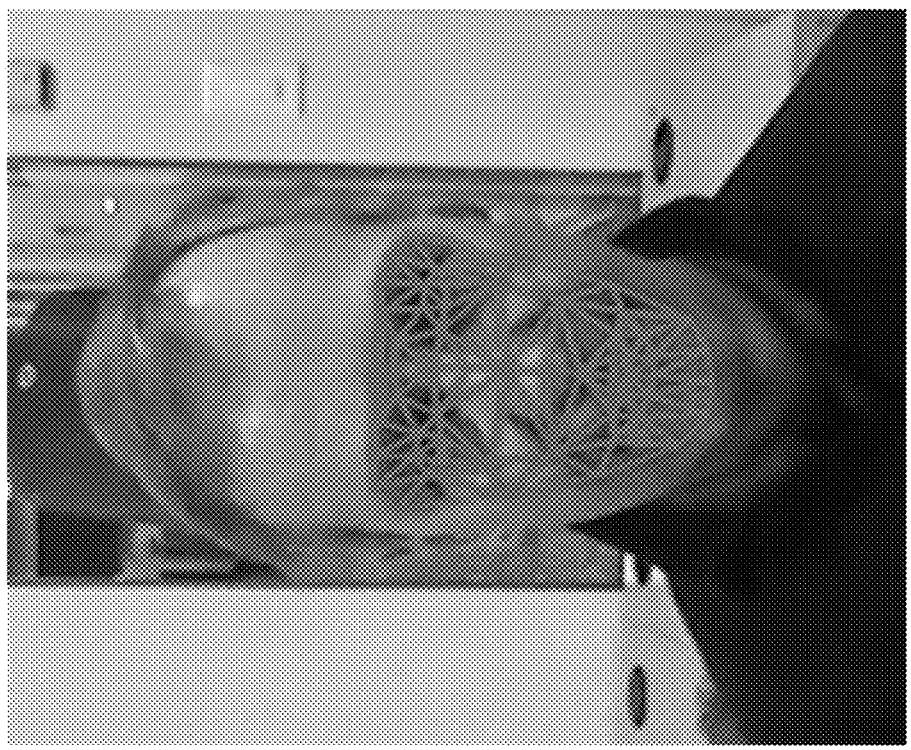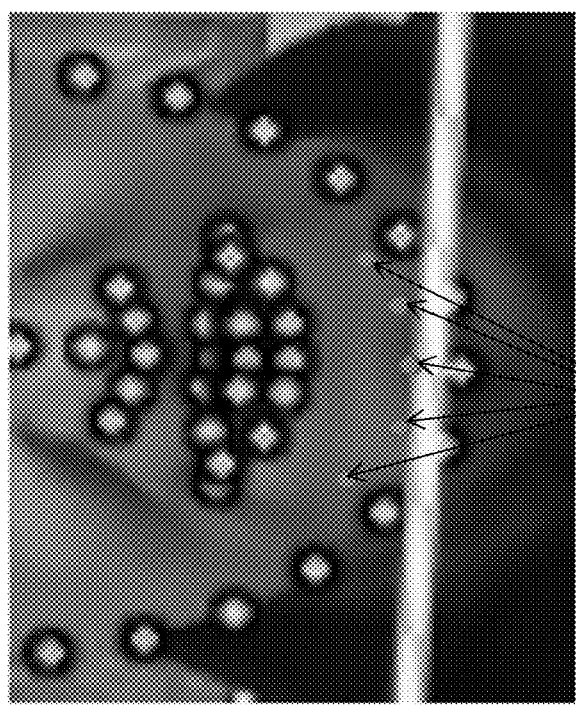
FIG. 8B

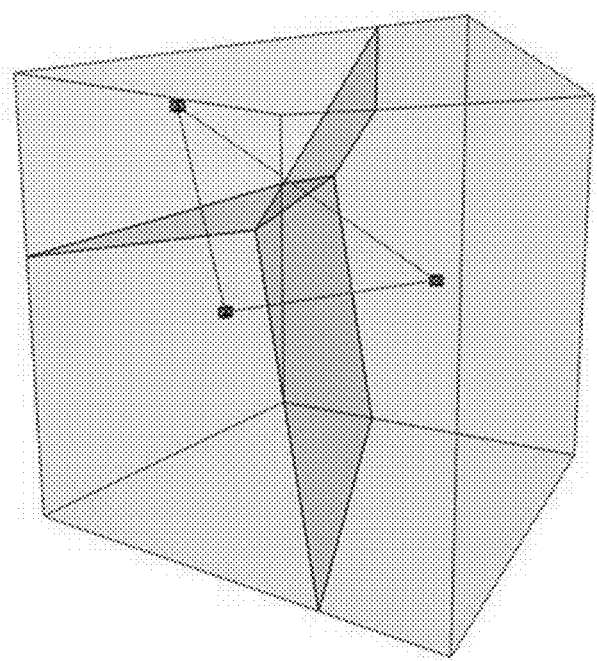
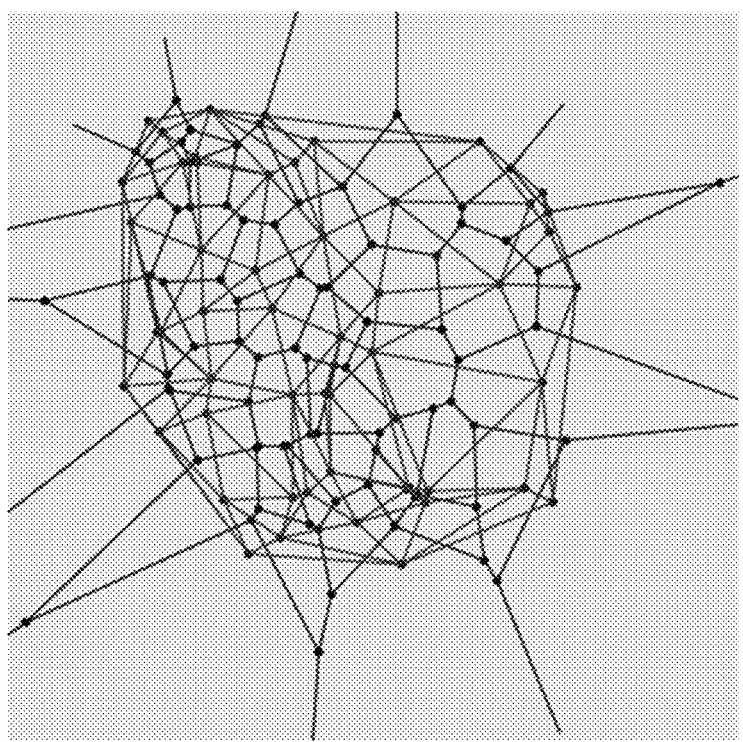
FIG. 9

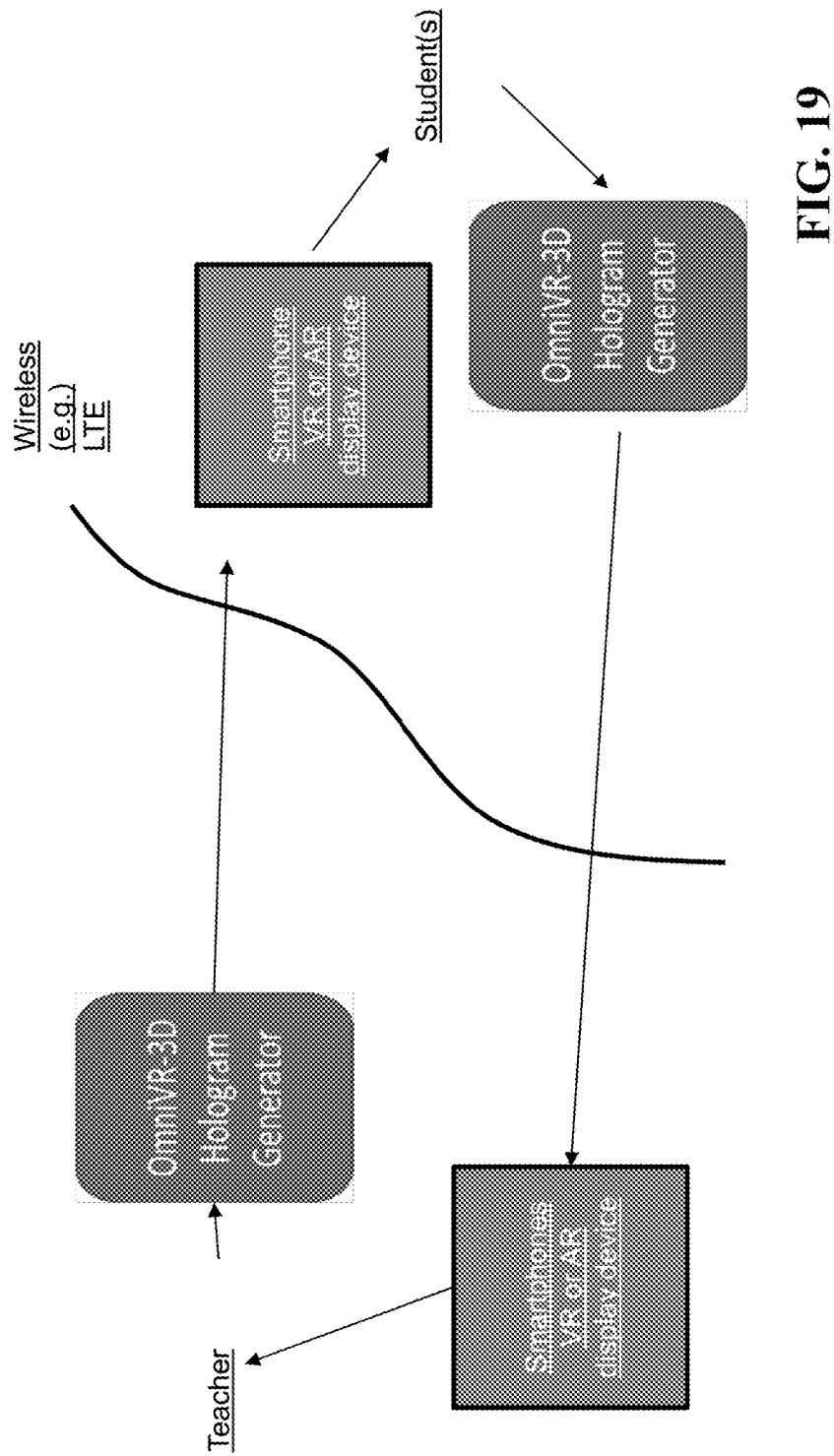

4D HOLOGRAM: REAL-TIME REMOTE AVATAR CREATION AND ANIMATION CONTROL

RELATED APPLICATIONS

This application claims priority to U.S. Provisional Patent Application No. 62/614,201, filed on Jan. 5, 2018, U.S. Provisional Patent Application No. 62/637,885, filed on Mar. 2, 2018, and U.S. Provisional Patent Application No. 62/658,338, filed on Apr. 16, 2018, the entirety of each of which is incorporated herein by reference.

TECHNICAL FIELD

This subject matter of this application relates generally to methods and apparatuses, including computer program products, for real-time remote avatar creation and animation control (e.g., a 4D hologram) using a depth camera over a low bandwidth network, and generating real-time 4D holograms of non-rigid, deformable objects—including people—by tracking and capturing these non-rigid objects, using 3D scanning and depth sensors, based on 2D and 3D features in real time, even when the object deforms during the scanning process.

BACKGROUND

To visually experience a live event from a remote location, a video can be streamed to a viewer at the remote location, or the event can be recorded and streamed later to the viewer. However, because bandwidth is limited in most cases, some form of compression (either lossless or lossy) such as MPEG-4 is used to reduce the amount of data being transmitted over the network by a factor of 100 or more. This allows the transmission of the video to be practical over low-bandwidth wired networks or most wireless networks.

With the advent of virtual reality (VR) and associated viewing devices (such as VR headsets), there is an emerging interest in virtually experiencing live events remotely. But, the amount of data required for transmission over a network may cause significant problems with quality and efficiency of the viewing experience, because an example data size for a single 3D model could be in tens of megabytes. As an example, for sixty frames per second, transmitting and processing the frames in sequence could result in gigabytes of data per second. Even with significant compression such as not transmitting portions of the scene that do not change from frame to frame (similar to video compression strategy), the process still results in tens of megabytes of data to be transmitted remotely—which makes it impractical, especially for wireless networks. Also, methods to further compress the data, such as traditional 3D compression to reduce the number of triangles, can significantly reduce visual quality.

SUMMARY

Therefore, what is needed are methods and systems for real-time 4D hologram technology that enables remote avatar creation and animation control using a depth camera over a low bandwidth network. Utilizing depth sensors and 3D scanning technologies, the techniques described herein provide for scanning a non-rigid object (such as person's upper body) to obtain a high-definition photorealistic 3D model (e.g., 3D selfie, or avatar), and transfer the 3D model to a remote display client through a network connection. The system can control and animate the 3D model in real-time by scanning and tracking the facial expression and movement of the person from the server's side. For realistic animation, only the movement of the facial landmarks and control points need to be captured and transferred through the network in real-time, thus the generation, control, and animation of a 3D model of a remote, non-rigid object can be achieved even using a low bandwidth network (such as a weak or unstable wireless connection). The technology described herein can be applied advantageously in many different computing applications such as gaming, entertainment, and teleconferencing (such as holographic-style communication).

In addition, further improvements include:
- The ability to combine 3D model building and remote animation control in single session processing (instead of two or more sessions), starting with online 3D model initialization and completion—such that a 'pre-scan' of the 3D model is not necessary.
- The 3D model/avatar is presented by static and dynamic meshes, and with the following enhanced features: real-time high definition texture map for face animation, with in-memory compression/decompression for accelerated performance.
- The advantage of handling deformable object scanning—allowing for facial expression change in the model building stage.
- The ability to extend deformable object scanning to general deformable object scan and modeling.

For realistic animation, only the movement of the facial landmarks and control points need to be captured and transferred through the network in real-time, thus the generation, control, and animation of a 3D model of a remote, non-rigid object can be achieved even using a low bandwidth network (such as a weak or unstable wireless connection).

The invention, in one aspect, features a system for real-time remote avatar creation and animation control. The system includes a sensor device that captures a plurality of images of one or more non-rigid objects in a scene and a server computing device coupled to the sensor device. The server computing device comprises a memory for storing computer-executable instructions and a processor that executes the computer executable instructions. The server computing device generates, for each image of the plurality of images captured by the sensor, an initial 3D model for each of the one or more non-rigid objects in the scene using the image. The server computing device detects one or more landmark points on the non-rigid objects using the initial 3D model. The server computing device generates a control point animation map for the 3D model using the detected landmark points. The server computing device maps the control point animation map to the 3D model to generate a mapped 3D model. The system further includes a viewing device coupled to the server computing device. The viewing device receives, from the server computing device, (i) the mapped 3D model and (ii) tracking information associated with the one or more non-rigid objects, including a model pose and deformation of the landmark points. The viewing device modifies the mapped 3D model using the tracking information. The viewing device renders a video stream of the one or more non-rigid objects on a display element of the viewing device using the modified mapped 3D model.

The invention, in another aspect, features a computerized method of real-time remote avatar creation and animation control. A sensor device captures a plurality of images of one or more non-rigid objects in a scene. A server computing device coupled to the sensor device generates, for each image of the plurality of images captured by the sensor, an initial 3D model for each of the one or more non-rigid objects in the scene using the image. The server computing device detects one or more landmark points on the non-rigid objects using the initial 3D model. The server computing device generates a control point animation map for the 3D model using the detected landmark points. The server computing device maps the control point animation map to the 3D model to generate a mapped 3D model. A viewing device coupled to the server computing device receives, from the server computing device, (i) the mapped 3D model and (ii) tracking information associated with the one or more non-rigid objects, including a model pose and deformation of the landmark points. The viewing device modifies the mapped 3D model using the tracking information. The viewing device renders a video stream of the one or more non-rigid objects on a display element of the viewing device using the modified mapped 3D model.

Any of the above aspects can include one or more of the following features. In some embodiments, at least one of the one or more non-rigid objects in the scene is a human. In some embodiments, generating an initial 3D model for each of the one or more non-rigid objects in the scene using the image comprises determining one or more vertices of each of the one or more non-rigid objects in the scene; determining one or more mesh faces associated with one or more surfaces of each of the one or more non-rigid objects in the scene; determining a surface normal for one or more surfaces of each of the one or more non-rigid objects in the scene; and generating the initial 3D model for each of the one or more non-rigid objects in the scene using the one or more vertices of the object, the one or more mesh faces of the object, and the surface normal for the one or more surfaces of the object.

In some embodiments, the one or more landmark points on the non-rigid objects correspond to one or more facial features of a human. In some embodiments, the one or more facial features comprise a mouth, a nose, an eye, or an eyebrow.

In some embodiments, generating a control point animation map for the initial 3D model using the detected landmark points comprises: locating the detected landmark points in 3D space using the initial 3D model; and extracting a 3D deformation for each point in the initial 3D model using the located landmark points. In some embodiments, locating the detected landmark points in 3D space using the initial 3D model comprises triangulating each of the detected landmark points on the initial 3D model using a triangulation function. In some embodiments, the triangulation function is a Delaunay triangulation.

In some embodiments, extracting a 3D deformation for each point in the initial 3D model using the located landmark points comprises: projecting each point of the initial 3D model onto a plane of the image; determining that the projected point of the initial 3D model is projected inside at least one triangle on the initial 3D model generated by the triangulation function; and approximating a 3D deformation for the projected point based upon a measured 3D deformation of one or more of the landmark points associated with the at least one triangle. In some embodiments, the measured 3D deformation of one or more of the landmark points associated with the at least one triangle is weighted based upon a predetermined condition.

In some embodiments, the viewing device receives a timestamp corresponding to the tracking information from the server computing device. In some embodiments, modifying the mapped 3D model using the tracking information comprises deforming the mapped 3D model using the tracking information to match a 3D model of the one or more non-rigid objects in the scene that is stored by the server computing device. In some embodiments, the viewing device receives the mapped 3D model at a different time than the viewing device receives the tracking information. In some embodiments, the viewing device periodically receives updated tracking information from the server computing device and the viewing device uses the updated tracking information to further modify the mapped 3D model.

In some embodiments, the server computing device inserts one or more control points in the control point animation map based upon a location of one or more of the landmark points. In some embodiments, the sensor device is in a first location and the viewing device is in a second location. In some embodiments, the second location is geographically remote from the first location. In some embodiments, the viewing device comprises a graphics processing unit (GPU) to render the video stream.

In some embodiments, the video stream comprises a three-dimensional avatar of one or more of the non-rigid objects in the stream. In some embodiments, an animation of the three-dimensional avatar of a non-rigid object at the viewing device is substantially synchronized with a movement of the corresponding non-rigid object in the scene as captured by the sensor device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 6A is a diagram of an avatar model split into dynamic and static meshes.

FIG. 6B is a diagram of high-definition textures for the static mesh and the dynamic mesh.

FIG. 8B is a diagram of an exemplary facial landmark detection and extraction using additional landmark points performed by the image processing module.

FIG. 9 is a diagram of a 3D Voroni tessellation.

FIGS. 15-19 show exemplary applications of the technology described herein.

DETAILED DESCRIPTION

Figure 1:
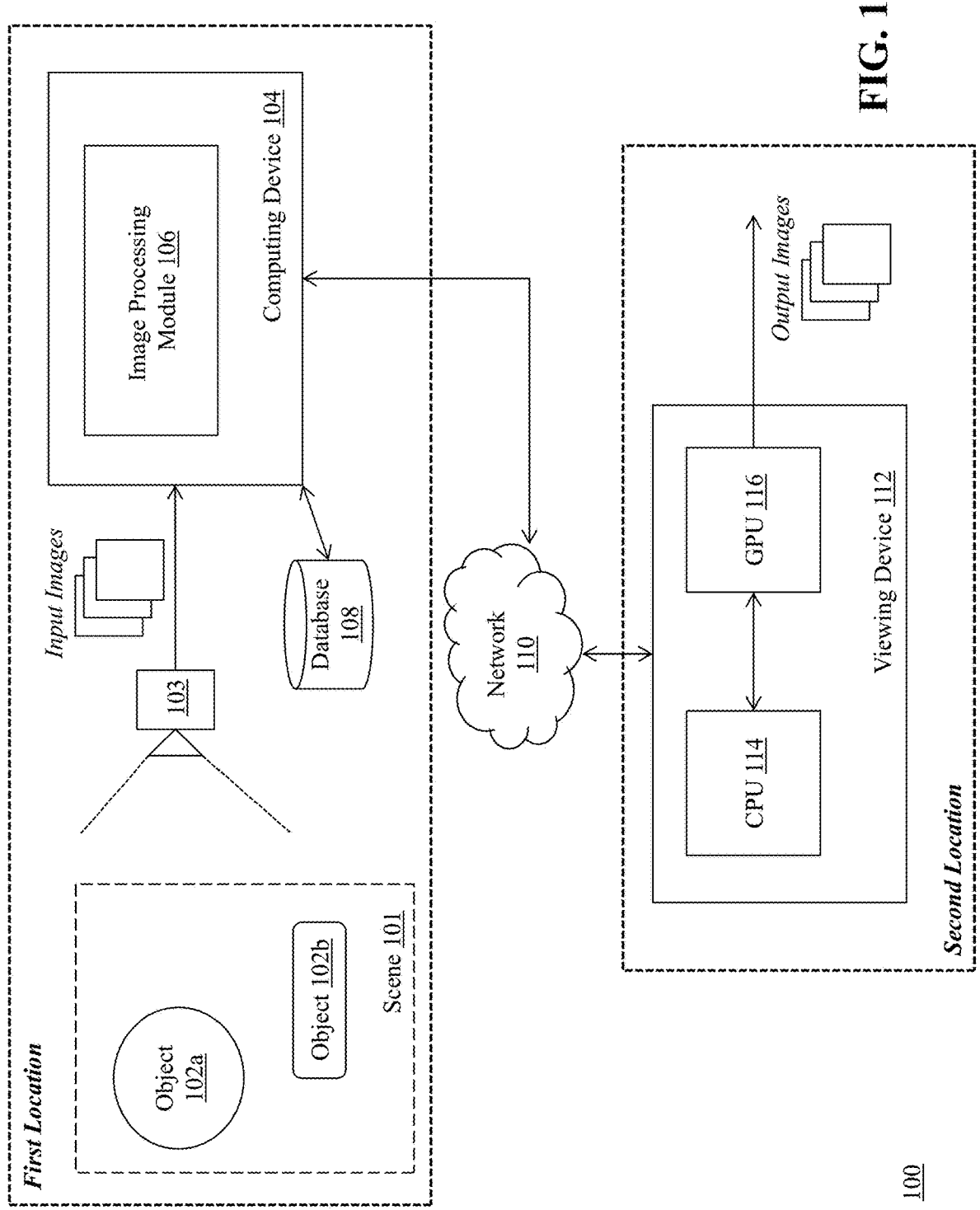
FIG. 1 is a block diagram of a system for real-time remote avatar creation and animation control.

FIG. 1 is a block diagram of a system 100 for real-time remote avatar creation and animation control. Certain embodiments of the systems and methods described in this application utilize:

- the real-time object recognition and modeling techniques as described in U.S. Pat. No. 9,715,761, titled "Real-Time 3D Computer Vision Processing Engine for Object Recognition, Reconstruction, and Analysis;"
- the dynamic 3D modeling techniques as described in U.S. patent application Ser. No. 14/849,172, titled "Real-Time Dynamic Three-Dimensional Adaptive Object Recognition and Model Reconstruction;"
- the shape-based registration and modeling techniques described in U.S. patent application Ser. No. 10/169,676, titled "Shape-Based Registration for Non-Rigid Objects with Large Holes;"
- the 3D photogrammetry techniques described in U.S. patent application Ser. No. 15/596,590, titled "3D Photogrammetry;"
- the sparse SLAM techniques described in U.S. patent application Ser. No. 15/638,278, titled "Sparse Simultaneous Localization and Mapping with Unified Tracking;" and
- the 2D and 3D video compression techniques described in U.S. patent application Ser. No. 15/726,316, titled "Real-Time Remote Collaboration and Virtual Presence using Simultaneous Localization and Mapping to Construct a 3D Model and Update a Scene Based on Sparse Data."

Each of the above-referenced patents and patent applications is incorporated by reference herein in its entirety. The methods and systems described in the above patents and patent applications, and in the present patent application, are available by implementing the Starry Night SDK, available from VanGogh Imaging, Inc. of McLean, Va.

The system 100 includes a sensor 103 coupled to a computing device 104. The computing device 104 includes an image processing module 106. In some embodiments, the computing device can also be coupled to a database 108 or other data storage device, e.g., used for storing certain 3D models, images, pose information, and other data as described herein. The system 100 also includes a communications network 110 coupled to the computing device 104, and a viewing device 112 communicably coupled to the network 110 in order to receive, e.g., 3D model data, image data, and other related data from the computing device 104 for the purposes described herein.

Figure 2:
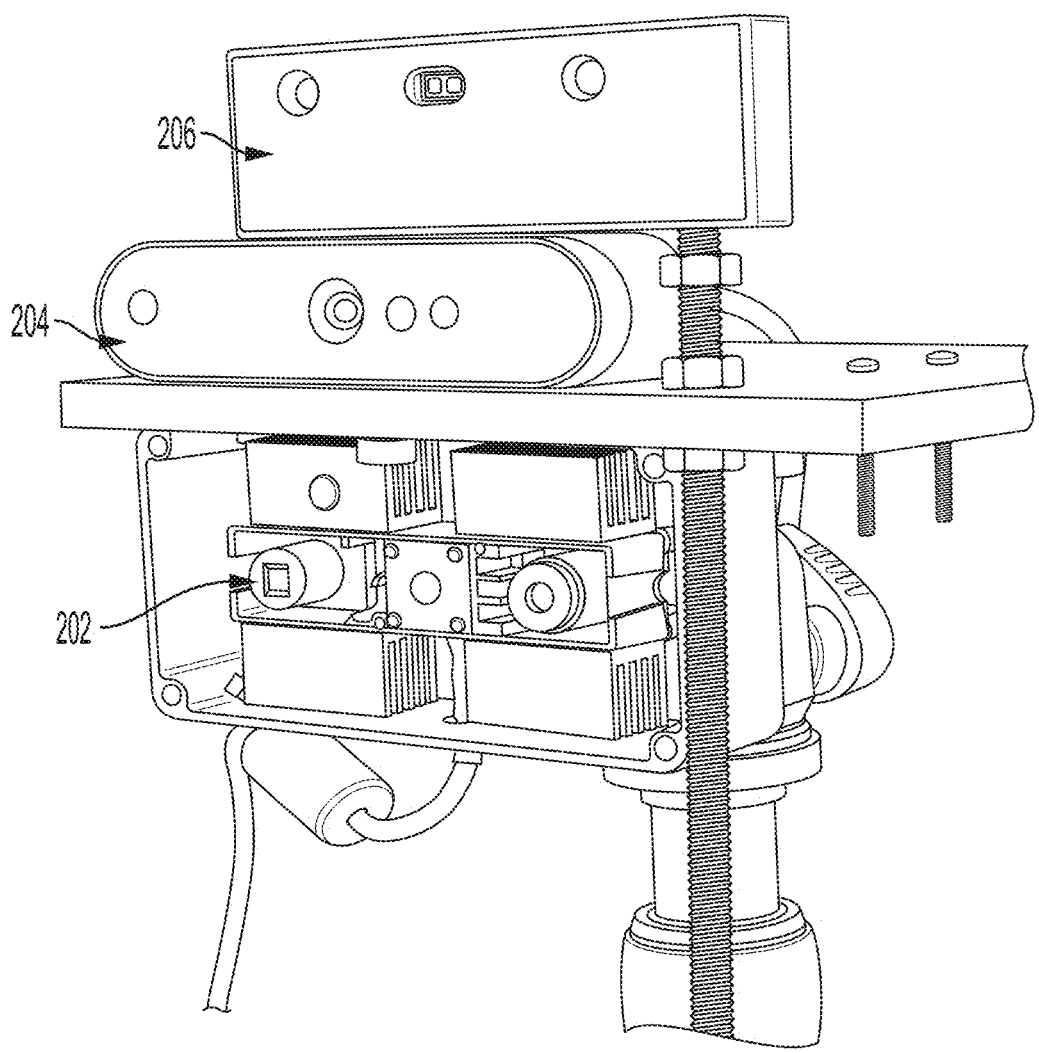
FIG. 2 is a diagram of an exemplary sensor.

The sensor 103 is positioned to capture images of a scene 101, which includes one or more physical, non-rigid objects (e.g., objects 102a-102b). Exemplary sensors that can be used in the system 100 include, but are not limited to, real-time 3D depth sensors, digital cameras, combination 3D depth and RGB camera devices, and other types of devices that are capable of capturing depth information of the pixels along with the images of a real-world object and/or scene to collect data on its position, location, and appearance. In some embodiments, the sensor 103 is embedded into the computing device 104, such as a camera in a smartphone or a 3D VR capture device, for example. In some embodiments, the sensor 103 further includes an inertial measurement unit (IMU) to capture data points such as heading, linear acceleration, rotation, and the like. An exemplary sensor 103 can be a 3D scanner built from combining a depth camera and a high-resolution RGB camera. The cameras can be calibrated so their data can be registered to each other. If needed, additional sensors can be combined—as shown in FIG. 2, where the sensor 103 includes an Orbbec Astra Mini depth camera (202), a Logitech 4K BRIO 8MP RGB camera (204), and an Intel RealSense 410 depth camera (206). It should be appreciated that other combinations of these devices or other devices can be used to perform the techniques described herein.

The computing device 104 receives images (also called scans) of the scene 101 from the sensor 103 and processes the images to generate 3D models of objects (e.g., objects 102a-102b) represented in the scene 101. The computing device 104 can take on many forms, including both mobile and non-mobile forms. Exemplary computing devices include, but are not limited to, a laptop computer, a desktop computer, a tablet computer, a smart phone, an internet of things (IoT) device, augmented reality (AR)/virtual reality (VR) devices (e.g., glasses, headset apparatuses, and so forth), or the like. In some embodiments, the sensor 103 and computing device 104 can be embedded in a larger mobile structure such as a robot or unmanned aerial vehicle (UAV). It should be appreciated that other computing devices can be used without departing from the scope of the invention. The computing device 104 includes network-interface components to connect to a communications network (e.g., network 110). In some embodiments, the network-interface components include components to connect to a wireless network, such as a Wi-Fi or cellular network, in order to access a wider network, such as the Internet.

The computing device 104 includes an image processing module 106 configured to receive images captured by the sensor 103 and analyze the images in a variety of ways, including detecting the position and location of objects represented in the images and generating 3D models of objects in the images.

The image processing module 106 is a hardware and/or software module that resides on the computing device 104 to perform functions associated with analyzing images capture by the scanner, including the generation of 3D models (e.g., .OBJ files) based upon objects in the images. In some embodiments, the functionality of the image processing module 106 is distributed among a plurality of computing devices. In some embodiments, the image processing module 106 operates in conjunction with other modules that are either also located on the computing device 104 or on other computing devices coupled to the computing device 104. It should be appreciated that any number of computing devices, arranged in a variety of architectures, resources, and configurations (e.g., cluster computing, virtual computing, cloud computing) can be used without departing from the scope of the invention. An exemplary image processing module 106 is the Starry Night SDK, available from Van-Gogh Imaging, Inc. of McLean, Va.

It should be appreciated that in one embodiment, the image processing module 106 comprises specialized hardware (such as a processor or system-on-chip) that is embedded into, e.g., a circuit board or other similar component of another device. In this embodiment, the image processing module 106 is specifically programmed with the image processing and modeling software functionality described below.

Figure 3:
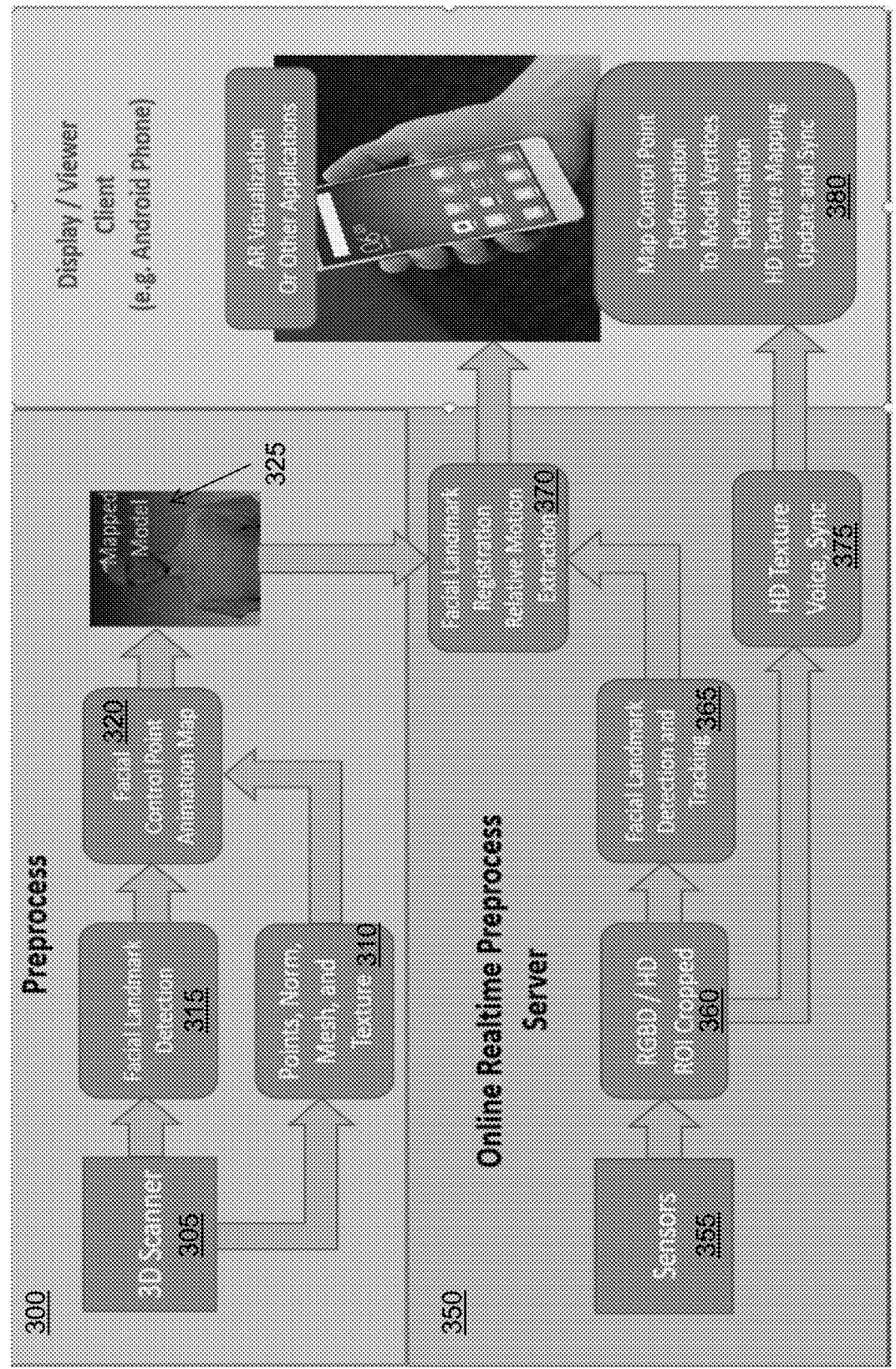
FIG. 3 is a flow diagram of a computerized method of real-time remote avatar creation and animation control.

FIG. 3 is a flow diagram of a computerized method of real-time remote avatar creation and animation control, using the system 100 of FIG. 1. The method shown in FIG. 3 comprises a two-stage process. The first stage 300 is the preprocessing stage for model building on the server side only, including holographic/3D selfie scan and modeling, high-definition texture mapping, facial landmark extraction, and animation control modeling. The second stage 350 is real-time remote avatar control and animation separately processed on both the client and server sides, including model registration and tracking, facial landmark deformation tracking, control point motion transferring, plus the remote model animation control and synchronization on the client side. It should be appreciated that, in some embodiments, the system creates an initial model from the first bunch of scanned data, then enhances and completes the avatar model during the following scan(s) and data capture. After the initial model is generated and transferred to the client side, the remote avatar visualization and animation is further improved, and then the completed avatar model is transferred to the client side to replace the initial model. Once sufficient data is collected, or there is no more data to be captured to improve the avatar model, the system is switched into a track and animation only mode.

Figure 4:
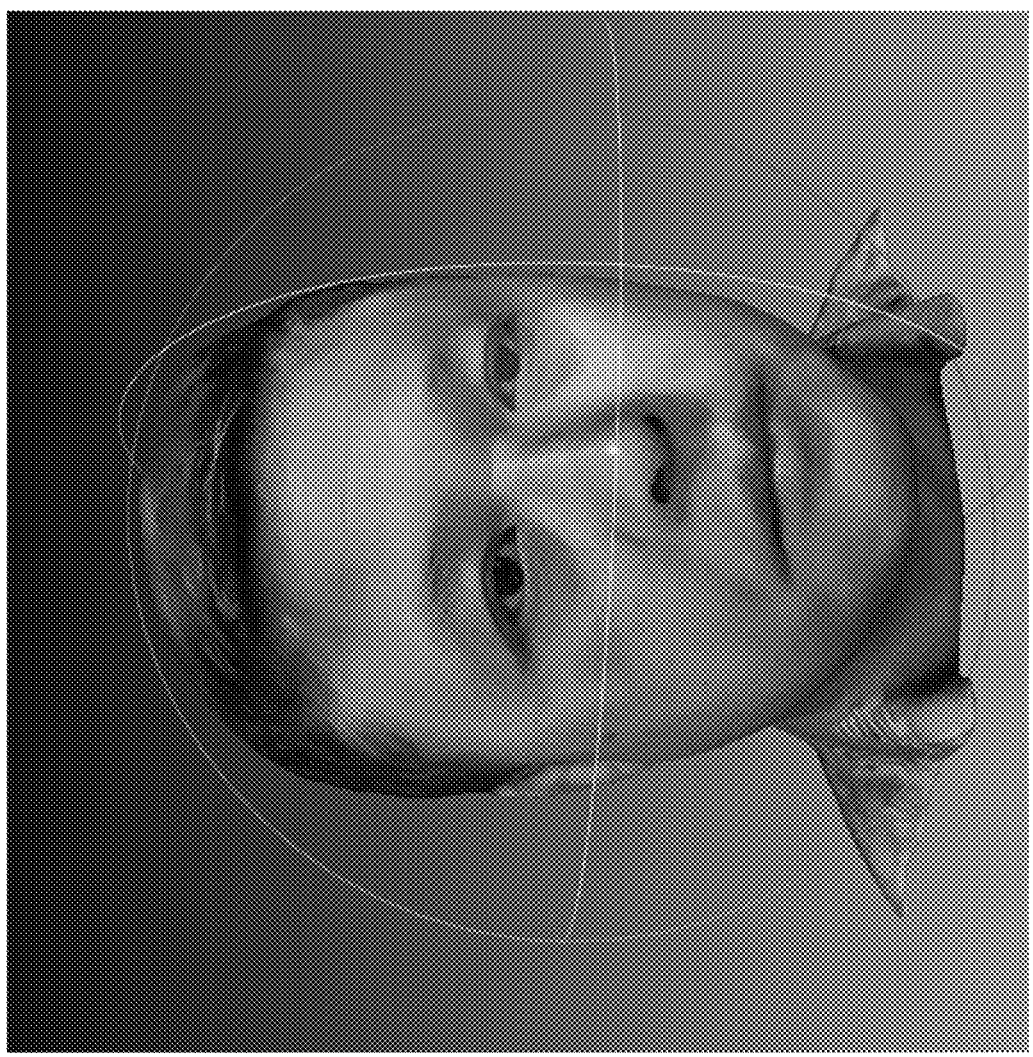
FIG. 4 is a diagram of an exemplary high-resolution photorealistic model.

For the holographic/3D selfie scan and modeling step 305 of FIG. 3, the sensor 103 captures one or more high-resolution color images of the object 102a (e.g., a person standing or sitting in front of the sensor). The image processing module 106 then generates a 3D model of the person using the captured images—including determining vertices, mesh faces, surface normal, and high-resolution texture in step 310. The 3D model can be generated by a rigid object scan or a non-rigid object scan. In the rigid object scan, the object/person remains rigid during the scan, and the 3D geometry of the object can then be extracted from the fusion of the sensor measurements that cover the surface, as described in the above-cited patents and patent applications that are incorporated herein by reference. In the non-rigid object scan, the person does not have to remain rigid and is allowed to move during the scan. The point cloud captured each time by the sensor are modeled as the combination of the canonical model and the deformation part. An optimization process is applied to solve the numerical equations to extract the best 3D surface of the object. The scanning process typically takes about 20-30 seconds. An example of a high-resolution photorealistic model generated by the sensor 103 and image processing module 106 during these steps 305 and 310 is shown in FIG. 4.

Figure 5A:
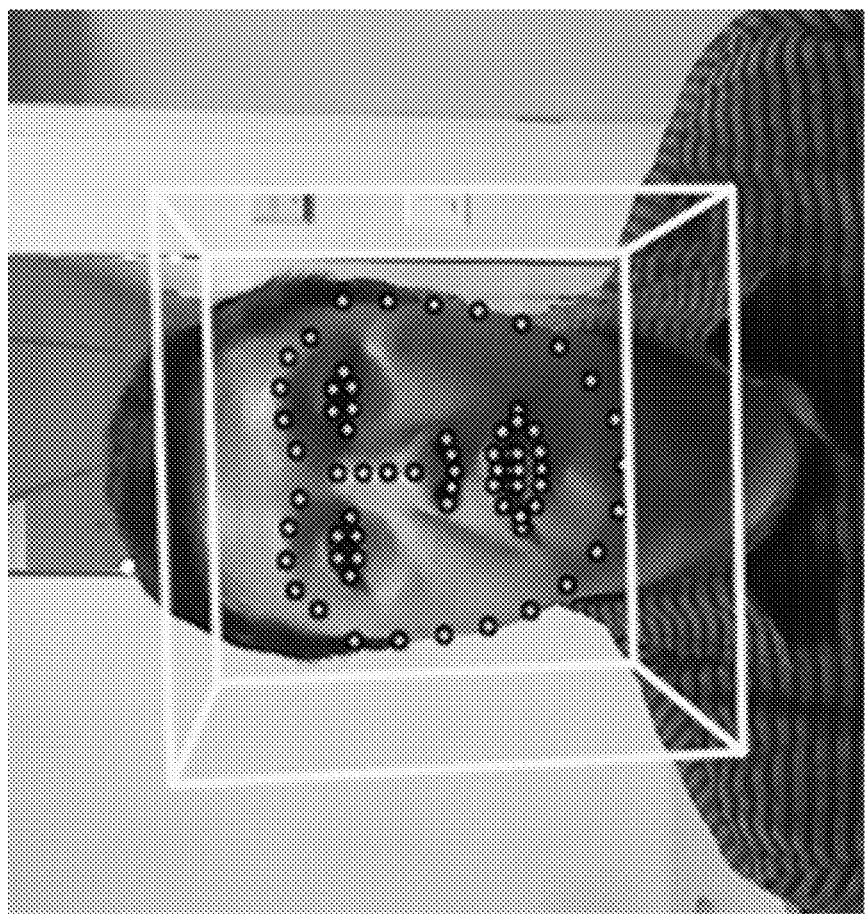
FIG. 5A is a diagram of an exemplary facial landmark detection and extraction performed by the image processing module.

Turning back to FIG. 3, the image processing module 106 also performs a facial landmark detection and extraction step 315 using the 3D model. In computer vision and graphics, facial landmarks are the visual features on human face, such as corners, boundaries, and centers of the mouth, nose, eyes and brows. The extraction of facial landmarks from images can be used for face recognition, and facial expression identification. In the hologram technology described herein, the system uses facial landmarks for facial expression tracking and animation. In one embodiment, the image processing module 106 can utilize the facial landmark model and corresponding open source code from the OpenFace technology (available at https://cmusatyalab.github.io/openface/) for facial landmark detection. It should be appreciated, however, that similar technologies for facial landmark detection and tracking can be applied in the systems and methods described herein to achieve the same results. An example of facial landmark extraction performed by the image processing module 106 is shown in FIG. 5A, where the dots indicate the locations of facial landmarks in an image. There are various technologies can be used to detect and localize such landmarks in images. For example, the facial landmark detection and localization techniques as described in J. M. Saragih et al., "Face Alignment through Subspace Constrained Mean-Shifts," Proceedings of IEEE International Conference on Computer Vision, 1034-1041, 10.1109/ICCV.2009.5459377 (September 2009), and in Zhang Z., Luo P., Loy C. C., Tang X. (2014) Facial Landmark Detection by Deep Multi-task Learning. In: Fleet D., Pajdla T., Schiele B., Tuytelaars T. (eds) Computer Vision—ECCV 2014. ECCV 2014. Lecture Notes in Computer Science, vol 8694. Springer, Cham, each of which is incorporated herein by reference.

The image processing module 106 registers the 2D RGB images with the 3D models, and the facial landmarks extracted from 2D images are combined with the scanned depth data to locate the landmarks in 3D space and extract their 3D deformations as well. The 3D holographic model is represented by a surface mesh of 3D vertices or points (with high-resolution texture mapping) that is denser than the facial landmarks. The image processing module 106 creates an animation map (step 320) for the landmarks/control points to control the deformation of the denser mesh. The animation map is modeled by triangulation of the landmark points, then approximate the mesh surface deformation by the deformation of landmark/control points with pre-defined interpolation functions (as shown in FIG. 5B).

Figure 5B:
FIG. 5B is a diagram of an exemplary animation map modeled by the image processing module.

For example, FIG. 5B shows the facial landmarks and their Delaunay triangulation of the face surface. The image processing module 106 projects all the model vertices on to the front image plane. If a 3D model vertex is mapped inside a given triangle (and with matching surface normal directions), its deformation can be approximated by the diagram and formula in FIG. 7 as described below.

In some embodiments, the system 100 is implemented with deformable object scan technologies for 3D model scanning. During the avatar generation component, the person being scanned can talk and make facial expression changes; he or she does not have to stay still during the model scanning. FIG. 6A shows an example where an avatar model is split into dynamic and static meshes (refer to the next section for more details). Note that in the complete model of FIG. 6A, the brightness of the dynamic mesh is intentionally reduced to show a clear difference. While the initial avatar model will cover mostly the dynamic mesh part, more data from the sensors is added to complete the model, and a smart generic model is applied to cover the area where is not covered in the live data collection. FIG. 6B is a diagram of high-definition textures for the static mesh and the dynamic mesh.

The image processing module 106 splits the avatar model into static and dynamic meshes to reduce the processing time for animation control and visualization. The static mesh covers the model where it is not necessary for real-time texture change. The dynamic mesh covers the part where both the geometry and texture need to be updated in real-time. The image processing module 106 only updates the dynamic mesh in real-time, and thus requires less computational power and less data transferring time. If necessary, the image processing module 106 can use more than one dynamic mesh (see FIG. 6B where the avatar model is split into static and dynamic mesh for better performance).

When the geometry and texture are updated simultaneously, the system realizes much more vivid and photorealistic animation that cannot be achieved with only the geometry update alone. However, the full texture is large (e.g., 2K×2K texture, 12 MB/frame for the full model) and it requires considerable processing power and data transferring bandwidth to achieve real-time performance (e.g., 30 FPS, on the client side, based upon mobile device processing power). In addition to splitting the avatar model into static mesh and dynamic meshes, the image processing module 106 applies an in-memory image compression to reduce the size of the image for data transferring from the server to the client side. A test of in-memory image jpeg compression shows that it takes less than 10 msec in average to compress 405 KB to about 30 KB.

As mentioned previously, initial avatar generation may not have sufficient coverage to build a complete avatar model (even with large hole filling enabled). The image processing module 106 can use a generic model, combined with hair color/texture in-painting technologies to complete the model. This model completion stage includes two parts:

Geometric completion with a generic model—warp a generic geometric model the was created from a pre-scanned model for hole filling; and Texture completion by inpainting—the missing part typically is mostly hair color and texture, this can be filled by referring the captured texture, and in-painting to expand the texture coverage over the hole filling area.

Also, during the online avatar generation completion component 302, the person being scanned can move naturally, talk, and make facial expressions—resulting in a model building process that is much more flexible and easier, and largely improves the users' experiences. Such flexibility is achieved by applying the deformable object scanning technology described below.

The image processing module 106 can assume that majority of the surface being scanned is not deformed or with very small deformation. During the scan, the relative deformation of the object surface is small from frame to frame. The image processing module 106 models each frame of the scanned data as the combination of a "rigid" canonical model and a deformation field. For each frame of the input data from the sensors, the image processing module 106 applies an iterative process to register the model and extract the deformation field, thus the input data removed of the deformation filed is combined with the "rigid" canonical model data for reconstruction and refinement.

As mentioned above, the image processing module 106 registers the 2D RGB images with the 3D models, and the facial landmarks extracted from 2D images are combined with the scanned depth data to locate the landmarks in 3D space and extract their 3D deformations as well. The 3D holographic model is represented by a surface mesh of 3D vertices or points (with high-resolution texture mapping) that is denser than the facial landmarks. The image processing module 106 creates an animation map (step 320) for the landmarks/control points to control the deformation of the denser mesh. The animation map is modeled by triangulation of the landmark points, then approximate the mesh surface deformation by the deformation of landmark/control points with pre-defined interpolation functions (as shown in FIG. 5B).

As described previously, FIG. 5B shows the facial landmarks and their Delaunay triangulation of the face surface. The image processing module 106 projects all the model vertices on to the front image plane. If a 3D model vertex is mapped inside a given triangle (and with matching surface normal directions), its deformation can be approximated by the diagram and formula in FIG. 7.

Figure 7:
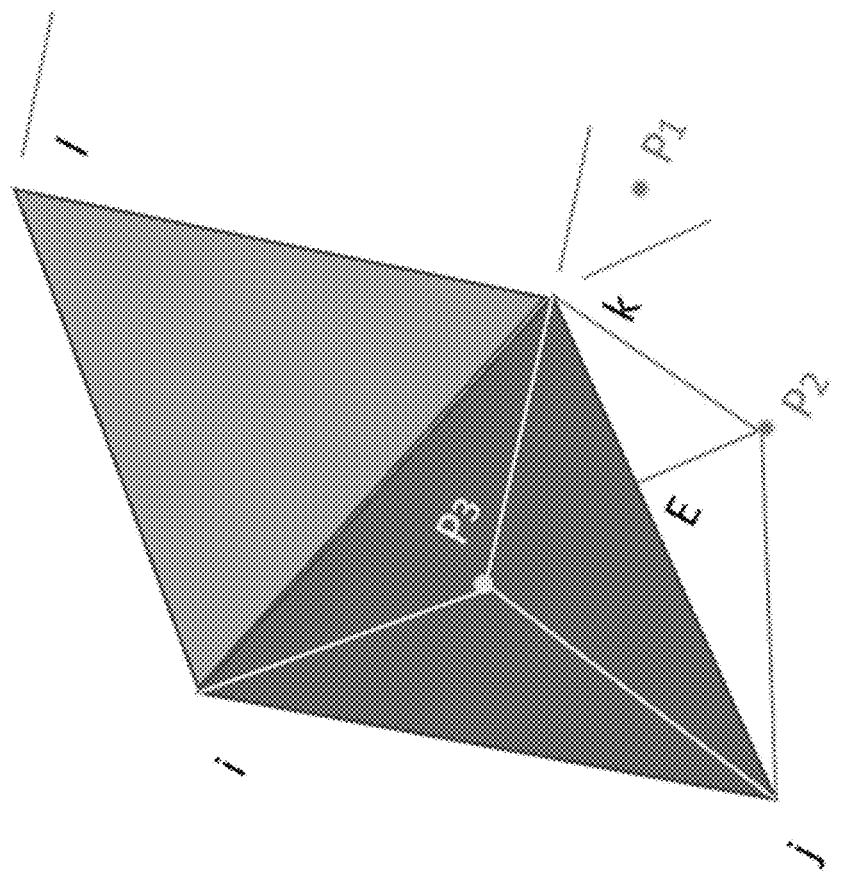
FIG. 7 is a diagram of an approximation of a deformation of a 3D model vertex.

As shown in FIG. 7, i, j, k, and l are the control points, P3 is a model point that mapped inside the triangle Δijk. Dp3 is the approximated deformation of P3; Di, Dj, and Dk are the measured 3D deformations of the corresponding landmark/control points. Scalers wi, wj, and wk are the user defined weights to adjust the animation effects. For example, if the user needs to exaggerate the mouth expression, and assuming control point m is one of the mouth landmark points, the image processing module 106 can set the weight to the group of landmark/control points that are part of the mouth as wm=1.25, then the deformation of the vertices close to control point m will be magnified by 25%. Scalers ci, cj, and ck are the corresponding control coefficients. It is required that these coefficients to be normalized (ci+cj+ck=1) and to keep the deformation/displacement continuity inside the triangle and on the boundaries with neighboring triangles. One way to compute these coefficients is:

$$ci = \text{Area}(\Delta jkp_3)/\text{Area}(\Delta ijk),$$

$$c_j = \text{Area}(\Delta ikp_3)/\text{Area}(\Delta ijk), \text{ and}$$

$$ck = \text{Area}(\Delta ijp_3)/\text{Area}(\Delta ijk).$$

For a point that is outside any of the triangles formed by the selected control points, such as P2 shown in FIG. 7, we can use the following equation to approximate their deformation from the control points:

$$D_{p2} = d_j w_j D_j + d_k w_k D_k$$

where dj and dk are the coefficients that can be computed from $$d_j = (D_{thr} - \text{Dist}(P_2, E)) * \text{Dist}(k, E)/(\text{Dist}(j,k) * D_{thr}), \text{ and}$$

$$d_k = (D_{thr} - \text{Dist}(P_2, E)) * \text{Dist}(j, E)/(\text{Dist}(j,k) * D_{thr}),$$

where Dthr is the threshold distance. This function should keep the deformation continuity on the boundary of the triangle, and fade away when the distance from the point to the edge increases.

For a vertex that is not close to any edge, but is close enough to a control point (such as the point P1 in FIG. 7), the deformation can be approximated with $$D_{p1} = e_k w_k D_k$$

where $e_k$ is the coefficient that can be computed as $e_k = (D_{thr} - \text{Dist}(P_1, k))/D_{thr}$.

Turning back to stage 300 of FIG. 3, the image processing module 106 can then generate a mapped 3D model 325 based upon the preprocessing steps 305, 310, 315, and 320. A texture mapped 3D model refers to the virtual object (model) not only has 3D geometric description, including vertices, faces, and surface normal, but also has mapped texture on the surface. The textures are extracted from the images captured during the scan. In the process, the camera poses are recorded, so for each face (represented by a triangle or a polygon) on the model surface the best view are extracted from the recorded images. Then these texture segments are combined and blended to obtain the integrated texture mapping of the object surface.

Next, the process continues to the real-time tracking stage 350—which comprises steps 355, 360, 365, 370, and 375. The image processing module 106 of the server computing device 104 receives additional images of the object 102a from the sensor 103 at step 355, and determines a region of interest (ROI) in the images (e.g., a person's face) and crops the images accordingly at step 360. The image processing module 106 extracts and tracks both the model pose and the relative deformation of the control points (i.e., the facial landmark points) at steps 365 and 370. The model pose and the control points deformation are then transferred to the viewing device 112 (also called the client-side device) through a network connection 110. As noted above, the viewing device 112 is a visualizer/viewer; in some embodiments, the viewing device 112 is a computing device (e.g., desktop, laptop), a tablet/smartphone, or the like with the scanned 3D hologram model already transferred and stored. When the animation starts, the viewing device 112 listens and receives the animation control points deformation, and modifies the 3D model geometry accordingly using the above approximation (step 380).

Because the image processing module 106 only needs to transfer the relative deformation of the control points, when the control points of both the server-side model and the client-side model are registered. The systems and methods described herein control not only the model scanned from the same person, but also any other remote model that can be registered with the facial landmarks—such as an emoji model.

In the second phase 350, the person who modeled the avatar is facing the sensor 103, his or her facial expression and movement are captured by the sensor 103, and the image processing module 106 extracts the facial landmark displacements together with the head pose. For each frame of the tracking process, the image processing module 106 transfers the 3D displacement of the measured control points together with the head pose, through the network 110. The main control data of each frame contains only the time-stamped control point deformations and the pose. Assuming 60 out of 72 control points are measured, the required data transfer size is 60*3*4+12*4<800 Byte/frame. Even at 30 frames-per-second (FPS), the system needs only 24 KB/sec bandwidth to achieve real-time avatar animation control.

Further animation and visualization enhancement are achieved by inserting additional control points on top of the facial landmarks, and by transferring and updating the HD texture of ROI (e.g., the eyes and mouth) in real-time—as described below.

Figure 8A:
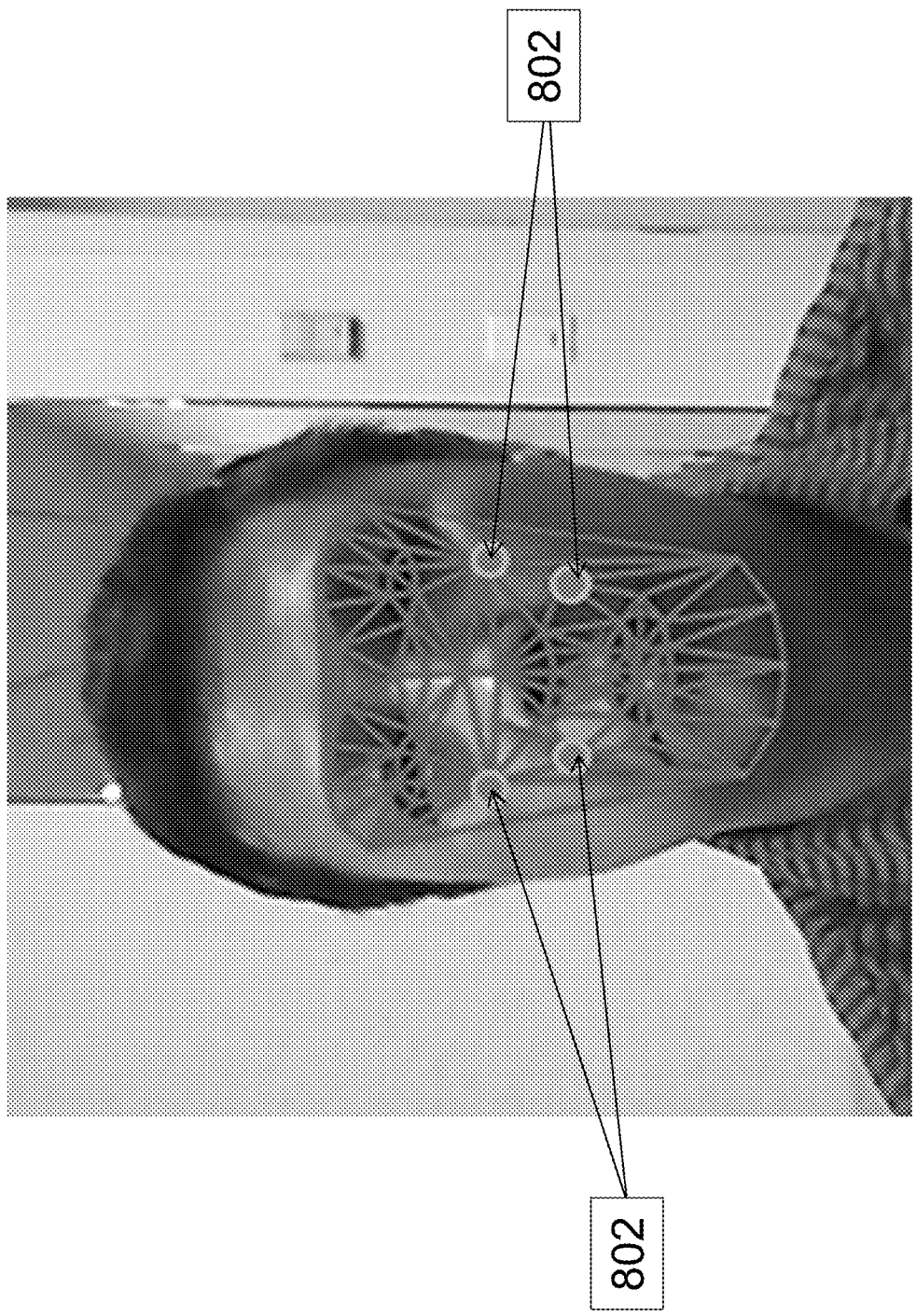
FIG. 8A is a diagram of an exemplary facial landmark detection and extraction using additional landmark points performed by the image processing module.

Inserting Additional Control Points:

As shown in FIG. 5A, some of the facial landmarks cannot be used to measure and control the facial expressing, such the landmarks on the left and right side of the face—where the system may not be able to obtain reliable depth measurements. On the other hand, there is a lack of landmarks on the cheek between the right mouth corner and the right eye corner, and between the left mouth corner and the left eye corner. The image processing module 106 can insert additional control points, such as the dots 802 shown in FIG. 8A and the dots 804 shown in FIG. 8B, to obtain depth measurement in those areas and get better animation control of the model on the viewer 112 side. One way to choose these points is to pick two more points on the line that connects the left mouth corner and left eye corners and divide that line segment into three equal segments, and do the same to the right side of the face to add two more control points on the other side. These additional landmarks can be derived from a location of a 2D landmark, shifted to where it is easier to obtain reliable depth measurement. For example, the five landmarks used to create the animation map are shifted toward the mouth, and no longer on the edge of the face (where they were originally located).

Because the model deformation by the facial expression change is small, applying the linear deformation map provides a good estimation of the dense deformation filed. The incoming data removed/subtracted of the estimated deformation can be used the same way as in the original VanGogh Imaging's StarryNight object scan for reconstruction and modeling of rigid objects. Comparing to rigid object scanning, deformable object scanning has the following additional processing for each frame of incoming data: the facial landmark extraction, facial landmark (and virtual ones) deformation estimation, and the dense deformation estimation (which is a linear process by applying the deformation map).

As can be appreciated, the image processing module 106 can expand the above deformable object scanning technologies for facial avatar modeling to scan more general deformable objects. The key to the generalized deformable object scanning is based on the following two assumptions:

The object is mostly rigid, i.e., the major surface of the object being scanned remains not deformed during the process.

The object deformation from frame to frame is relatively small.

The image processing module 106 also applies the following key measures in its scanning algorithms to reduce the computation and accelerate the scanning process:

1) Use landmarks to track the object motion and segment the surface. The landmarks can be identified by extinguish visual features (e.g., ORB, MESR, and SIFT), or 3D features (e.g., Surface Curvature and NURF), or combination of both. The guideline is, based on the texture and geometry, the image processing module 106 adaptively uses the most suitable features, or combination of feature for the given section of data.

2) For areas that are not covered by distinctive 2D or 3D features, the image processing module 106 adds/generates virtual landmarks in the same manner as the generation of the facial virtual landmarks.

3) Create a predefined deformation map based on the initial location of the above landmarks, and the corresponding space segmentation (by, e.g., Voronoi tessellation). The deformation map provides a good initialization of the non-linear deformation field, thus accelerating the more accurate deformation field estimation.

4) Solve the optimization problem to obtain the more accurate deformation field that minimizes the errors between the incoming sensor data (depth map) and the reconstructed model, while enforce the smoothness of the model surface deformation (by a term that panelizes the discontinuity of the deformation).

The following provides additional details for the above processing:

Initialization

1) Initial scan and modeling: after the initial bunch of frames, the image processing module 106 obtains the initial canonical model, and performs the following functions:

a) Detect and Identify Real Landmarks—these real landmarks are either identified with strong visual features such as ORB, MSER, strong 3D surface features, or combination of these features. The image processing module 106 treats the landmark detection, tracking, and alignment as another problem.

b) Add virtual landmarks, to complete the cover of the surface, especially at where there is lack of real visual or 3D landmarks.

c) Segment the object geometric domain. The image processing module 106 uses an approach that can properly handle 3D shapes, for example, applying the 3D Voronoi tessellation (see FIG. 9) on the 3D domain of the model vertices, use the real and virtual landmarks as nodes.

d) Create the deformation trees, each landmark will be the root of a tree, and the model vertices fall in the corresponding Voronoi polyhedron and are connected (this means that the vertex can be connected to the center node by a path that connection neighboring vertices) to the root vertex/landmark are the primary leaves of the tree. The vertices connected to the primary leaves and fall in the neighboring polyhedron, and the distances to the root landmark is inside of a cut-off radius, are added as the secondary leaves.

e) All the above landmark deformation trees can be a node of the space based tree, such as an Octree for accelerated data search and access.

2) Initialize the deformation map: any given vertex of the model is the primary leaf of a deformation tree, and could be the secondary leaf of one or multiple deformation trees at the same time. The deformation coefficients of the corresponding landmarks over the vertex are determined by a radial basis function of the distances to the landmarks, and normalized/scaled to limit the deformation and ensure the smoothness and continuity of the model surface.

Solving for the Deformation Field:

3) When larger deformation or geometric configuration change is involved, the deformation field obtained from the deformation tree and deformation map is used as the initialization of the deformation field. The more accurate deformation field is then obtained by minimizing the following energy function:

$$\varepsilon(DF_t, S_t, D_t, D_{tree}) = \varepsilon(DF_t, S_t, D_t) + p*\text{Reg}(DF_t, D_{tree}),$$

where $DF_t$ is the deformation field at time t, $D_t$ is the depth map from the sensors, $S_t$ is the canonical rigid model projected to the current sensor coordinate system, $D_{tree}$ is the vertex-landmark connectivity defined in the deformation tree. $\varepsilon(DF_t, S_t, D_t)$ is the term for the model alignment error, it can be evaluated by summing up the square of distances of all the vertices with the given ICP alignment and the correspond deformation field. The $p*\text{Reg}(DF_t, D_{tree})$ is the penalty term to regulate the discontinuity between the connected vertices to ensure the smoothness of deformation.

Expanding the Model and Deformation Field:

4) Expansion of the model and the deformation trees: Unless there is a large geometric or topologic change of the object being scanned, the pre-defined deformation map, including the deformation trees and the corresponding deformation coefficients, should remain constant. The image processing module 106 updates the deformation map when a certain number of vertices are added to the model, and the deformations of additional vertices cannot be sufficiently covered and modeled by the existing deformation map. In this case, new landmarks are added, and the corresponding deformation tree are built and inserted as well.

5) When a new landmark is generated and the corresponding deformation tree is added, only the neighboring trees that overlapped with the added deformation tree are affected, and thus the corresponding deformation maps are updated as well.

Performance Improvement:

6) The key to a successful deformable model scan is the fast processing (thus the frame to frame change is small) and the convergence of the above optimization problem, to obtain the more accurate estimation of deformation of the landmarks.

7) The landmark based object tracking and deformation map helps to achieve better object tracking, better deformation field initialization (close to the optimized solution), and it reduces the number of variables and leads to a more efficient solution of the non-linear optimization problem.

8) Dual quaternion blending is an unambiguous and singularity free way to present the landmark deformations in both translation and rotation (normal). The image processing module 106 also uses it to compute the interpolation of deformation of vertices in the deformation tree.

9) High definition texture mapping: the image processing module 106 accounts for the warping of texture between the deformed and non-deformed models:

a) At the texture mapping stage, the image processing module 106 keeps the deformation field associated with the HD images.

b) Apply a patch based approach. For each patch, the texture is mapped with the deformation filed added to the model. And then the texture coordinates of the vertices remain constant with or without the associated deformation.

Dynamic Rigging

Based on the deformation tree, the image processing module 106 can then use it to automatically 'rig' any object, and not just the face. The concept is to track 2D and 3D feature changes which can be the control points for the 'rig'. This allows the potential for animating any 3D model.

Figure 10A:
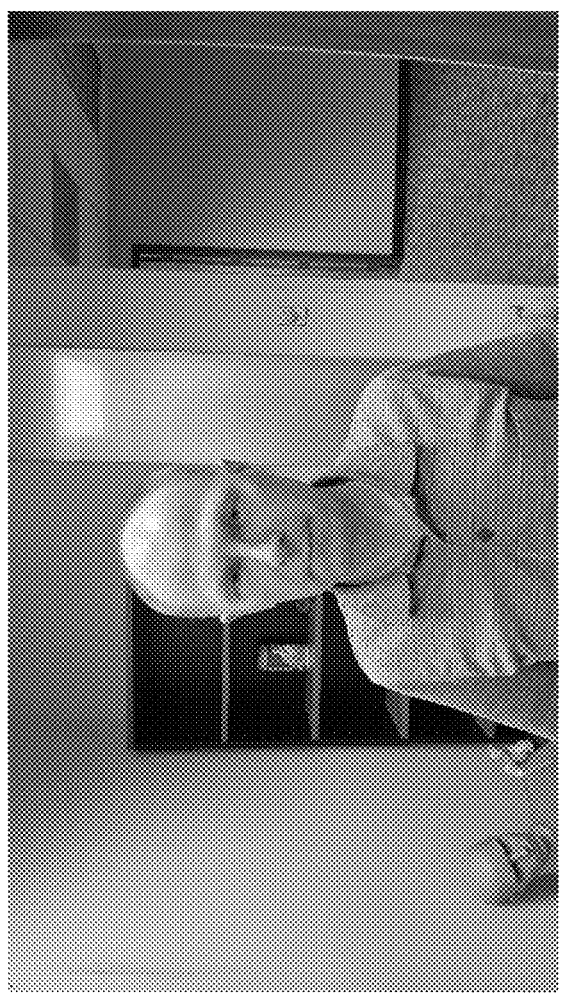
FIG. 10A is a diagram of a full size high resolution image captured by the sensor.
Figure 10B:
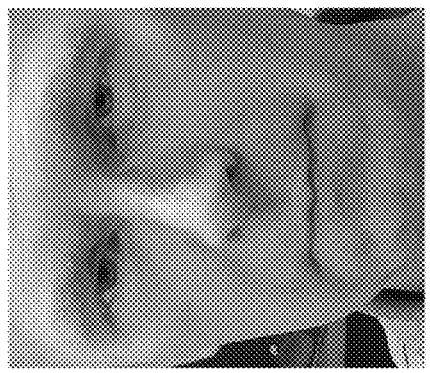
FIG. 10B is a diagram of a region of interest (ROI) that is cropped from the image of FIG. 10A.

High Resolution Texture Updating:

High resolution texture mapping greatly enhances the avatar visualization, and the same can be applied to enhance the remote avatar animation display as well. To reduce the bandwidth required for the data transferring and the time required on the client side to update the model texture, the system limits the size of the texture need to be updated to only the part where most texture change happens—the area that covers the landmark mesh shown in FIG. 5B. FIG. 10A depicts a full size high resolution image captured by the sensor 103, while FIG. 10B depicts a region of interest (ROI) (e.g., the person's face) that is cropped by the image processing module 106 to update the texture of the remote model—which is only a small portion of the overall image.

Figure 11:
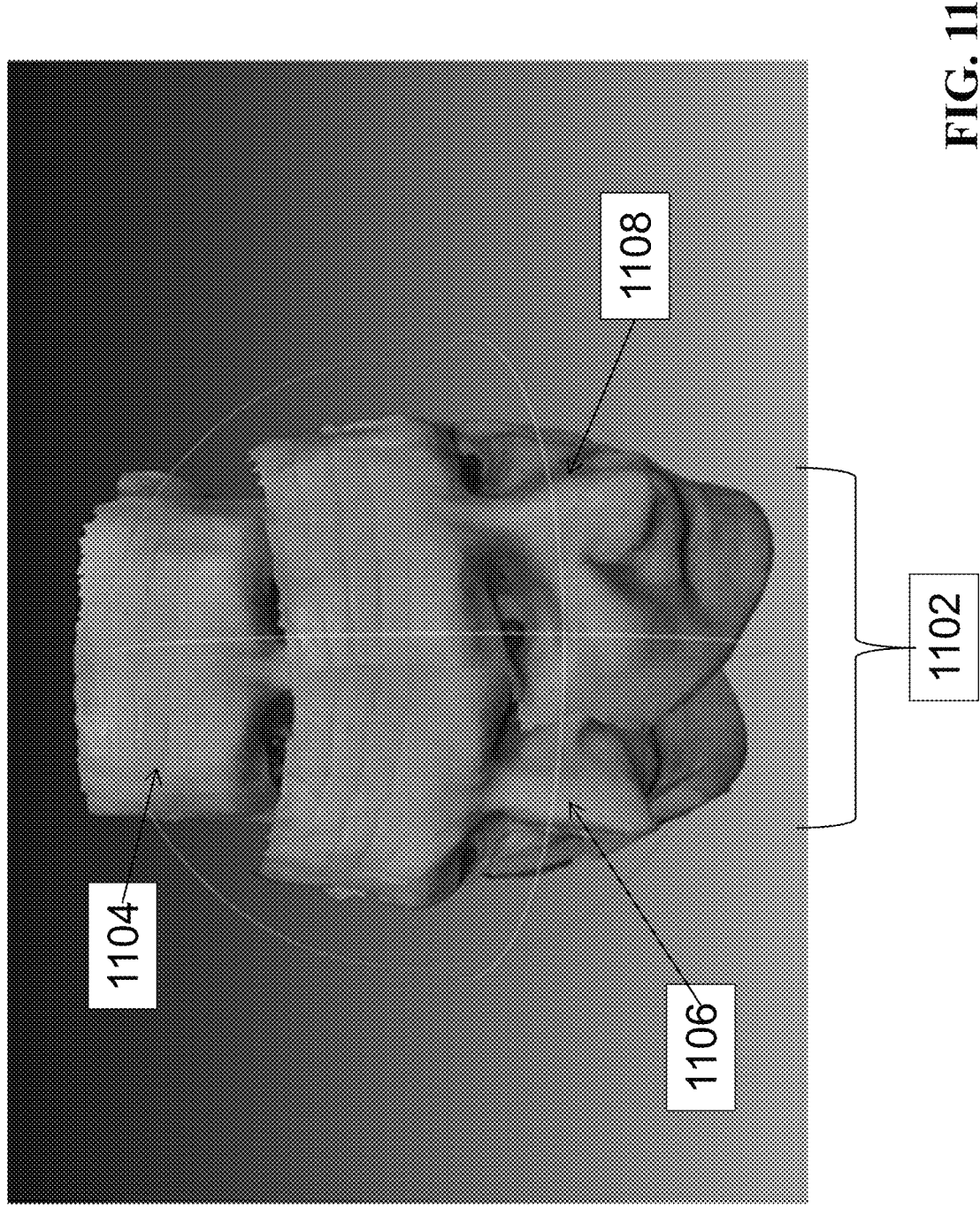
FIG. 11 depicts three positions of a 3D model for relative motion.

Model Rotation and Translation:

when a person is moving, the system can capture his/her relative motion to the camera, for transfer and visualization on the client side, so that the remote viewer can better experience the person's motion and body gestures. FIG. 11 illustrates part of the animated 3D model—the center image 1102 showing three animated positions of the avatar face model overlaid to show the relative motions. The center model 1104 is the original position of the model, the left front model 1106 shows the person's position and posture when the person is turning right and leaning forward a little, and the right front model 1108 shows the person's position and posture when he is turning right and leaning forward. To represent such motion, the image processing module 106 tracks the person's pose and transfer the pose (including rotation and translation) to the viewer 112.

Occluded Landmarks and Texture:

for example, when a person is turning significantly (e.g., even more than the rotation shown in FIG. 11), a large part of one side of the face typically is not visible to the sensor, and thus the texture and control point motion is not captured. On the other hand, because the 3D model is visualized on the client side, the occluded part of the face still needs to be animated and textured. One solution to this is to use the measurement of the other side to derive the displacement of the occluded control points, based on the symmetry of the object (e.g. face).

To achieve better texture mapping performance, the image processing module 106 can split the avatar mesh into two parts, and then apply the same animation control map descripted above the texture mapping coordinates of the 3D scanned model to the split mesh which has most of the animation change.

Depending on the properties of the RGB texture camera, the texture capturing could result in some delay of the data. To address this issue, the system uses timestamps on both the server side and the client side to synchronize the visualization and animation. To achieve this, on the server 104 keeps a ring buffer for each set of the frame measurements and each texture image. Then, the server 104 groups the control point measurements and the texture by their smallest timestamp difference and send to the client side.

On the client side, visualization and animation of the avatar should also follow the sequence of the time stamps of each frame. For example, the data of three frames are transferred to the client side, with time stamps Tsi−1, Tsi, and Tsi+1. And, frame i−1 is updated on the client side at time Tci−1, when the data of frame i is received at time Tci then the viewing device 112 performs the following:

if
Tci−Tci−1<Tsi−Tsi−1, then the viewing device 112 should wait for the difference before update else if
(Tci−Tci−1)−(Tsi−Tsi−1)>threshold, then it is too late, the viewing device 112 should skip and work on the frame i+1, to keep the visualization is synchronized with the time sequence from the server-side activities.

Voice Synchronization:

In the example where a person is giving a speech, the system can synchronize the sound with the 3D model by segmenting the sound data flow into segments with timestamps on the server side and transferring the voice segments to the client side (see step 375 of FIG. 3). The time stamps are used to control the voice segment playback together with the animation updates, to make sure that the voice are synchronized with the model animation and activities.

Also, it should be appreciated that the data transfer rate through the network can be adjusted according to the network connection bandwidth and the data processing speed of the client-side device. For example, when the bandwidth is sufficient, and the client-side data processing is fast enough, the image processing module 106 can choose to send higher resolution texture and/or at a higher updating frame rate, and vice versa, so as to optimize the viewer's experience.

In another aspect, instead of (or in some embodiments, in conjunction with) using the facial landmark points to track facial expressions and animate an avatar as noted above, the image processing module 106 can track the person using non-rigid tracking based on dynamic fusion. In this technique, the image processing module 106 extracts a deformation graph in real-time and sends the deformation graph to the second location, where the viewing device 112 uses the deformation graph to deform the 3D model for animation purposes. By using this technique, the system 100 can animate not just the face of the avatar, but the entire upper body—or even the entire body—in real-time. An exemplary dynamic fusion technique that can be used by the system 100 is described in U.S. Provisional Patent Application No. 62/637,885, titled "Dynamic Deformable Object and People Scanning for 4D Hologram." Another exemplary dynamic fusion technique that can be used by the system 100 is described in U.S. Provisional Patent Application No. 62/658,338, titled "Computerized Systems and Methods for Generating a Photorealistic 3D Avatar," which is incorporated herein by reference.

Figure 12:
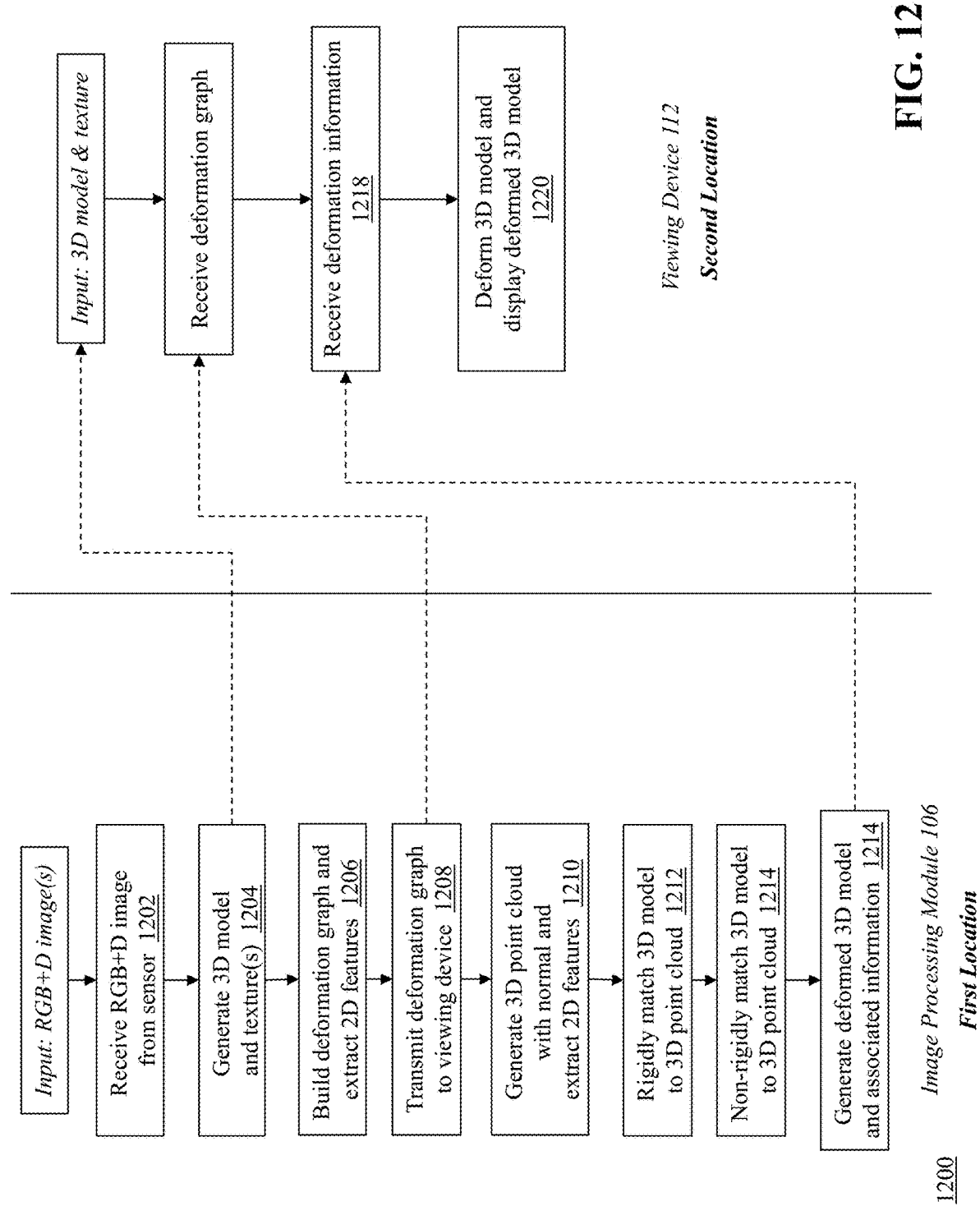
FIG. 12 is a flow diagram of a computerized method of performing non-rigid tracking based on dynamic fusion for real-time remote avatar creation and animation control.

FIG. 12 is a flow diagram of a computerized method 1200 of performing non-rigid tracking based on dynamic fusion for real-time remote avatar creation and animation control, using the system 100 of FIG. 1. The image processing module 106 at the first location receives (1202) an RGB+ Depth image of the object 102a (and/or object 102b) in the scene 101 from the sensor 103. The image processing module 106 also generates (1204) a 3D model and corresponding texture(s) of the objects 102a, 102b in the scene 101 using, e.g., the real-time object recognition and modeling techniques as described in U.S. Pat. No. 9,715,761, titled "Real-Time 3D Computer Vision Processing Engine for Object Recognition, Reconstruction, and Analysis;" the dynamic 3D modeling techniques as described in U.S. patent application Ser. No. 14/849,172, titled "Real-Time Dynamic Three-Dimensional Adaptive Object Recognition and Model Reconstruction;" and the shape-based registration and modeling techniques described in U.S. Pat. No. 10,169,676, titled "Shape-Based Registration for Non-Rigid Objects with Large Holes"—as implemented in the Starry Night SDK, available from VanGogh Imaging, Inc. of McLean, Va.

The image processing module 106 builds (1206) a deformation graph of the 3D model, and extracts 2D features from the texture(s) associated with the image. The deformation graph is used for 3D non-rigid deformation of a 3D point cloud (e.g., the 3D model of the object(s) 102a, 102b). It should be appreciated that, for the same 3D point cloud, the corresponding deformation graph only needs to be built once.

In some embodiments, the deformation graph built by the image processing module 106 is a 3D graph consisting of a plurality of deformation nodes. Each deformation node includes following data: a 3D position of the deformation ode, a 3D transformation of the deformation node, and identification of one or more neighboring 3D nodes.

The deformation nodes can be generated by the image processing module 106 by uniform down-sampling of the received 3D model. The 3D position of each deformation node is the 3D position of the corresponding down-sampled point. The 3D transformation can consist of a 3D rotation matrix, initialized as an identity matrix, and a translation vector, initialized as a zero vector. The neighbor of each deformation node can be generated by the image processing module 106 by using, e.g., a 3D nearest neighbor searching algorithm such as those described in M. Muja and D. Lowe, "FLANN—Fast Library for Approximate Nearest Neighbors, User Manual," (2013), available at https://www.cs.ub-c.ca/research/flann/uploads/FLANN/flann_manual-1.8.4.pdf, and M. Muj a and D. Lowe, "Scalable Nearest Neighbor Algorithms for High Dimensional Data," *IEEE*

Transactions on Pattern Analysis and Machine Intelligence, Vol. 36 (2014), each of which is incorporated herein by reference.

To deform a 3D point in the 3D model, first search for the k nearest deformation nodes to the 3D point, then the deformed point is:

$$p' = \text{Deform}(p) = \sum_k w_i(R_i * p + t_i)$$

where p is the original 3D point location, p' is the deformed 3D point position, $R_i$ is the 3D rotation matrix of the i-th deformation node, $t_i$ is the 3D translation vector of the i-th deformation node, $w_i$ is a weight representing the influence of the i-th deformation node on the 3D point, and the weight is inversely related to the distance between the 3D point and the i-th deformation node. Additional information on the above deformation algorithm is described in R. Sumner et al., "Embedded Deformation for Shape Manipulation," SIGGRAPH '07, *ACM Transactions on Graphics (TOG)*, Vol. 26, Issue 3, July 2007, Article No. 80, which is incorporated herein by reference.

To extract the 2D features from the corresponding texture(s), the image processing module 106 can use any of a number of different algorithms, including but not limited to: ORB (as described in R. Mur-Atal, ORB-SLAM: a versatile and accurate monocular SLAM system," IEEE Transactions on Robotics (2015)), SURF (as described in H. Bay et al., "Speeded Up Robust Features (SURF)," Computer Vision and Image Understanding 110 (2008) 346-359), or BRISKS (as described in Guan, Hao & A. P. Smith, William. (2017). BRISKS: Binary Features for Spherical Images on a Geodesic Grid. 4886-4894. 10.1109/CVPR.2017.519—each of which is incorporated herein by reference.

Figure 13:
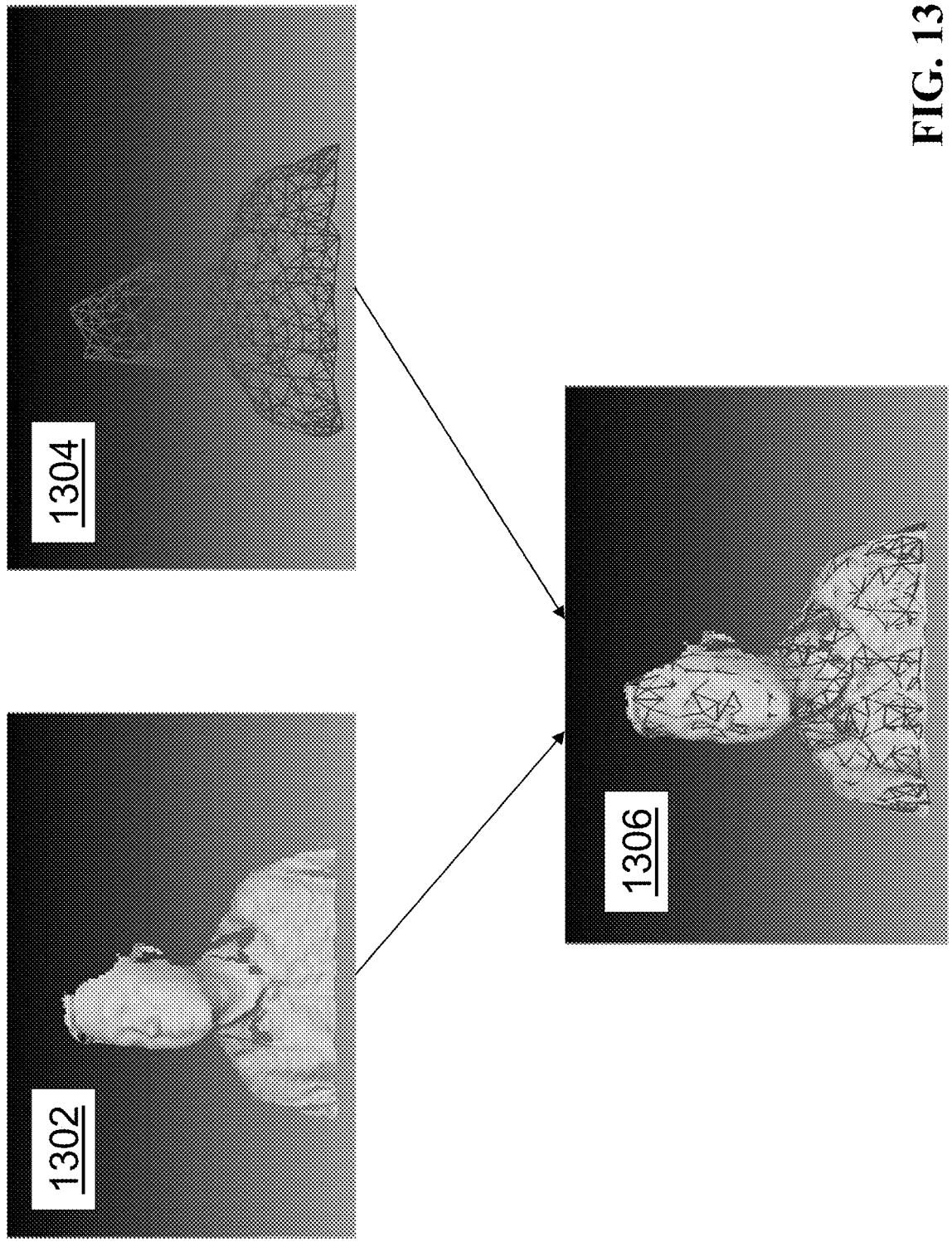
FIG. 13 is a diagram of an exemplary 3D model overlaid with a deformation graph.

Then, the image processing module 106 transmits (1208) the deformation graph to the viewing device 112 at the second location to deform the 3D model (e.g., a 3D model of the object(s) 102a, 102b in the scene 101 that was previously received from the image processing module 106, and/or a newly-received 3D model). FIG. 13 is a diagram of an exemplary 3D model overlaid with a deformation graph generated by the image processing module 106. As shown in FIG. 13, the image 1302 is an exemplary 3D model of a person that is generated by the image processing module 106. The image 1304 is an exemplary deformation graph built by the image processing module 106 as described above. The image 1306 shows how the deformation graph is overlaid on the 3D model in order to deform the 3D model. It should be appreciated that, in some embodiments, the deformation graph for the same 3D model does not change, so the viewing device 112 only needs to receive the deformation graph once (i.e., at the beginning of the capture process) from the image processing module 106.

Next, the image processing module 106 generates (1210) a 3D point cloud with normal of the object(s) 102a, 102b in the image and extracts 2D features of the object(s) from the image. In one embodiment, the image processing module 106 generates the 3D point cloud using one or more depth frames with depth camera intrinsic parameters, and the normal of each point in the 3D point cloud can be extracted by applying local plane fitting, Eigen value decomposition, or Singular value decomposition algorithm (as described in K. Klasing et al., "Comparison of Surface Normal Estimation Methods for Range Sensing Applications," *ICRA '09, Proceedings of the 2009 IEEE international conference on Robotics and Automation* pp. 1977-1982 (May 2009), which is incorporated herein by reference). In addition, the image processing module 106 can extract the 2D features using, e.g., one or more of the ORB, SURF, or BRISKS algorithms described above.

The image processing module 106 then rigidly matches (1212) the 3D model to the generated 3D point cloud. In one embodiment, the iterative closest point (ICP) algorithm described in U.S. patent application Ser. No. 14/849,172, titled "Real-Time Dynamic Three-Dimensional Adaptive Object Recognition and Model Reconstruction," can be used by the image processing module 106 to rigidly match the 3D model to the 3D point cloud. The image processing module 106 uses the ICP algorithm to generate a 3D rotation matrix and a translation vector for 3D rigid matching. The image processing module 106 assigns the 3D transformation of each deformation node using the ICP algorithm output, so that the deformation using the deformation graph generates the same rigid matching as the ICP algorithm does.

The image processing module 106 then non-rigidly matches (1214) the 3D model to the 3D point cloud using 3D points, normal, and 2D features. To non-rigidly match the 3D model to the 3D point cloud, the image processing module 106 iteratively minimizes the matching error—which consists of 3D matching error, 2D matching error and smoothness error—by optimizing the 3D transformation of each deformation node.

The error function is:

$$E = E_{3D} + E_{2D} + E_{smooth}$$

$E_{3D}$ represents the 3D matching error:

$$E_{3D} = \Sigma(n_{loose}(\text{Deform}(p_{anchor}) - p_{loose}))^2$$

where $p_{anchor}$ is a point from 3D model; $p_{loose}$ is $p_{anchor}$'s matched point in 3D point cloud; $n_{loose}$ is $p_{loose}$'s normal.

$E_2D$ represents 2D matching error:

$$E_{2D} = \Sigma(\text{Deform}(f_{anchor}) - f_{loose})^2$$

where $f_{anchor}$ is the 3D position of a 2D feature from 3D model; $f_{loose}$ is the 3D position of $f_{anchor}$'s matched 3D feature in 3D point cloud.

$E_{smooth}$ represents smoothness error to ensure the consistency of 3D transformation among deform nodes:

$$E_{smooth} = \sum_i \sum_{j \in i\text{'s neighbor}} ((R_i * p_j + t_i) - (R_j * p_i + t_j))^2$$

where $R_i$ and $t_i$ are the 3D transformation of the i-th deform node, $p_i$ is 3D position of the i-th deform node; and j is one of neighboring deformation node of the i-th deform node In some embodiments, the 3D transformation of all of the deformation nodes is optimized by the GPU 116 of the viewing device 112 using a preconditioned conjugate gradient (PCG) algorithm that is implemented in the GPU of the viewing device 112 to ensure efficient, real-time performance. Additional detail regarding the above-referenced non-rigid matching techniques is described in R. A. Newcombe et al., "DynamicFusion: Reconstruction and Tracking of Non-rigid Scenes in Real-Time," *Proceedings of the IEEE Conference on Computer Vision and Pattern Recognition (CVPR)*, 2015, pp. 343-352, and in M. Innmann et al., "VolumeDeform: Real-time Volumetric Non-rigid Registration," arXiv:1603.08161v2 [cs.CV] 30 Jul. 2016, available at https://arxiv.org/abs/1603.08161, each of which is incorporated herein by reference.

Next, the image processing module 106 generates (1216) as output a deformed 3D model and associated deformation information—i.e., 3D transformation for each of the deformation nodes. The final deformed 3D model matches the input from the sensor 103, and the final 3D model can then be used as 3D model input to match the next input from the sensor 103. Further, the deformation information is transmitted by the image processing module 106 to the viewing device 112, which receives (1018) the deformation information along with a timestamp from the module 106. The viewing device 112 uses the information to deform the 3D model to match the input RBG+Depth scan captured by the sensor 103 and display the deformed 3D model to a user of the viewing device 112 at the second location.

Figure 14:
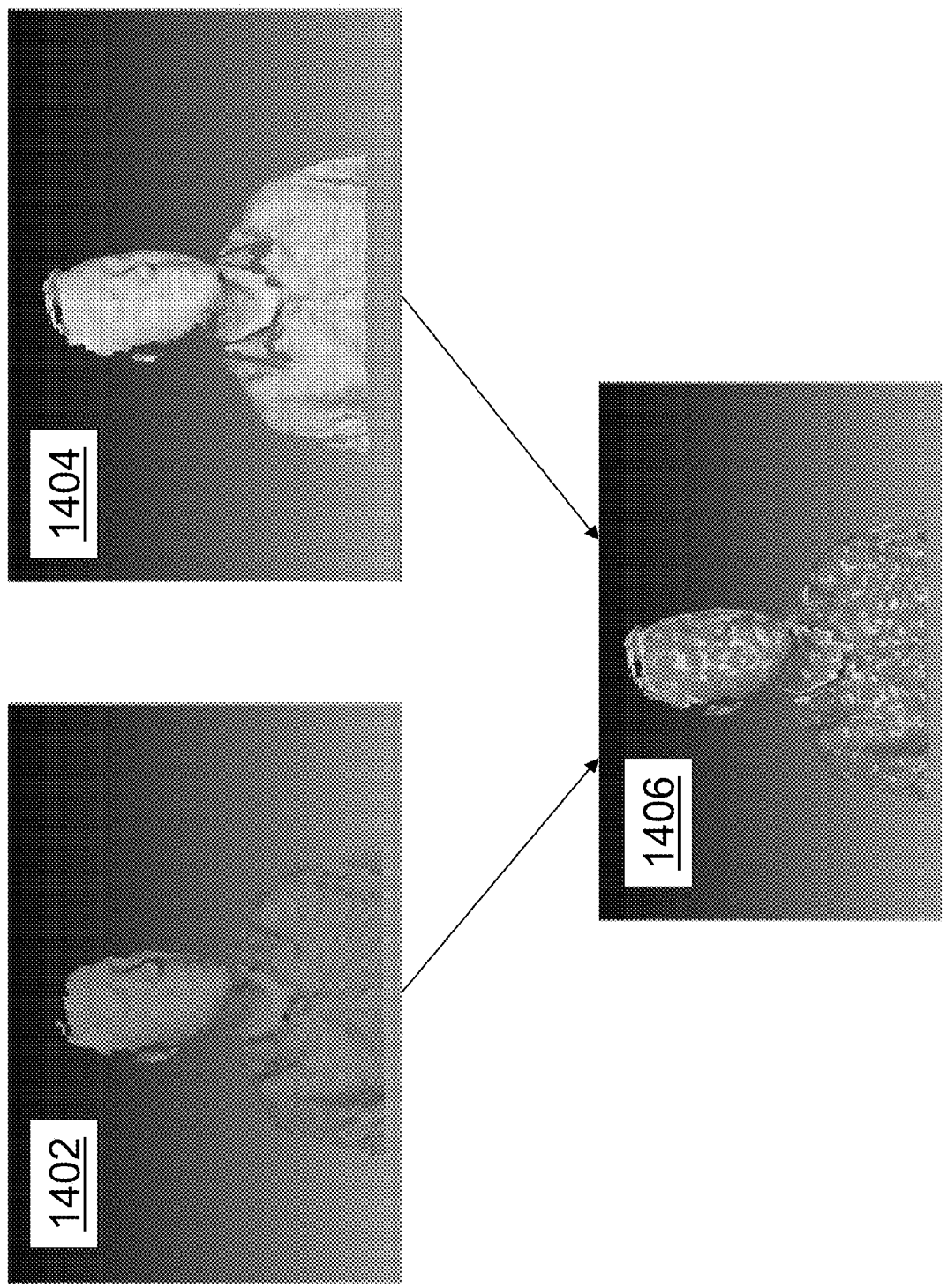
FIG. 14 is a diagram of an exemplary deformed 3D model overlaid with an input image.

FIG. 14 is a diagram of an exemplary deformed 3D model overlaid with an input image, as generated by the system 100 of FIG. 1. As shown in FIG. 14, the image 1402 is an input depth image captured by the sensor 103 and received by the image processing module 106. The image 1404 is a deformed 3D model that is matched to the input image by the module 106 as described above. The image 1406 is the deformed 3D model overlaid with the input image by the viewing device 112 to generate a 3D avatar.

The methods, systems, and techniques described herein are applicable to a wide variety of useful commercial and/or technical applications. Such applications can include, but are not limited to:

Augmented Reality/Virtual Reality, Robotics, Education, Part Inspection, E-Commerce, Social Media, Internet of Things—to capture, track, and interact with real-world objects from a scene for representation in a virtual environment, such as remote interaction with objects and/or scenes by a viewing device in another location, including any applications where there may be constraints on file size and transmission speed but a high-definition image is still capable of being rendered on the viewing device;

Live Streaming—for example, in order to live stream a 3D scene such as a sports event, a concert, a live presentation, and the like, the techniques described herein can be used to immediately send out a sparse frame to the viewing device at the remote location. As the 3D model becomes more complete, the techniques provide for adding full texture. This is similar to video applications that display a low-resolution image first while the applications download a high-definition image. Furthermore, the techniques can leverage 3D model compression to further reduce the geometric complexity and provide a seamless streaming experience;

Recording for Later 'Replay'—the techniques can advantageously be used to store images and relative pose information (as described above) in order to replay the scene and objects at a later time. For example, the computing device can store 3D models, image data, pose data, and sparse feature point data associated with the sensor capturing, e.g., a video of the scene and objects in the scene. Then, the viewing device 112 can later receive this information and recreate the entire video using the models, images, pose data and feature point data.

Figure 15:
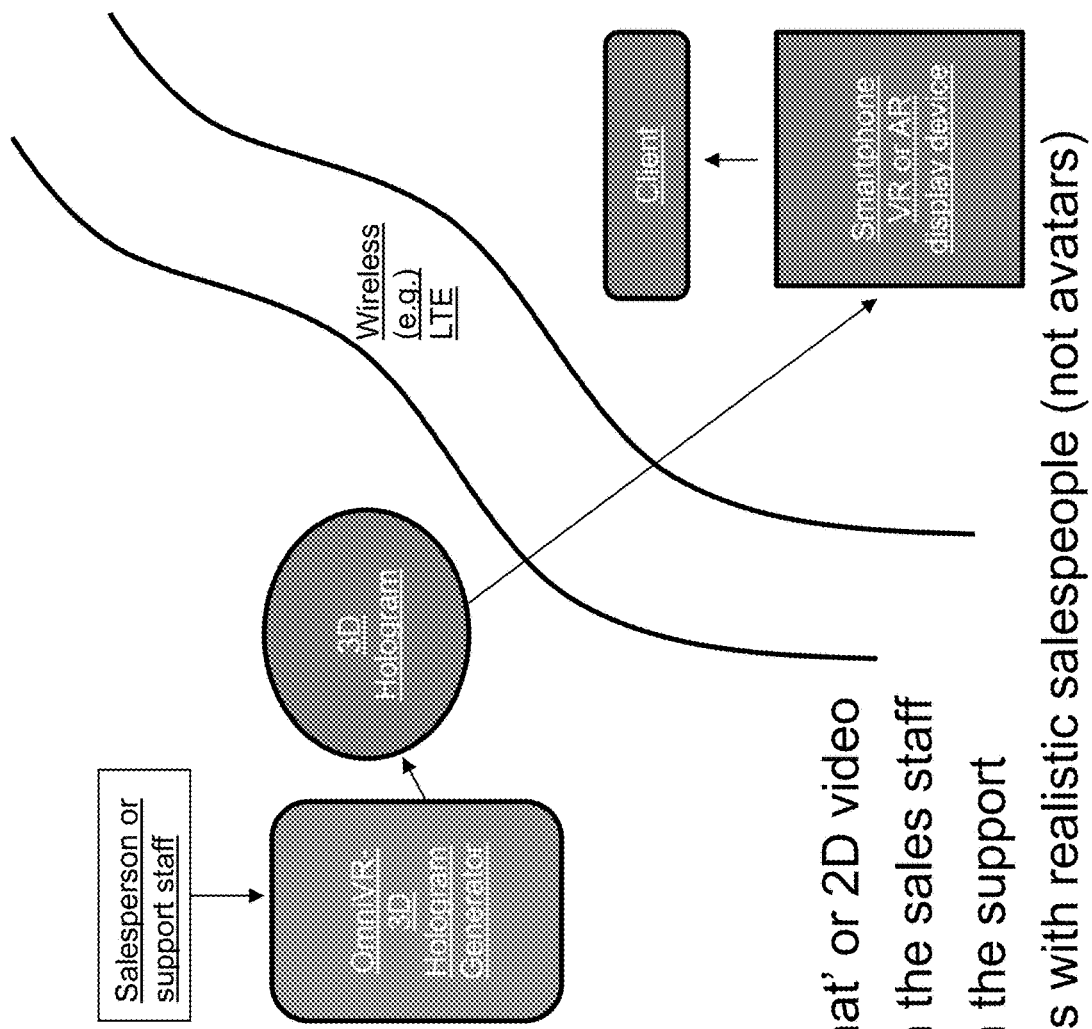

Further examples of such applications are shown in FIGS. 15-19. For example, the techniques can be leveraged in the context of e-commerce, as shown in FIG. 15, for applications such as virtual stores, advertising, product support, customer service, and the like. The sensor 103 can capture images of a customer support representative for transmission to a client device (e.g., laptop, mobile phone) of a customer. Such an application provides the advantage of a live, 3D interactive sales and support experience.

Figure 16:
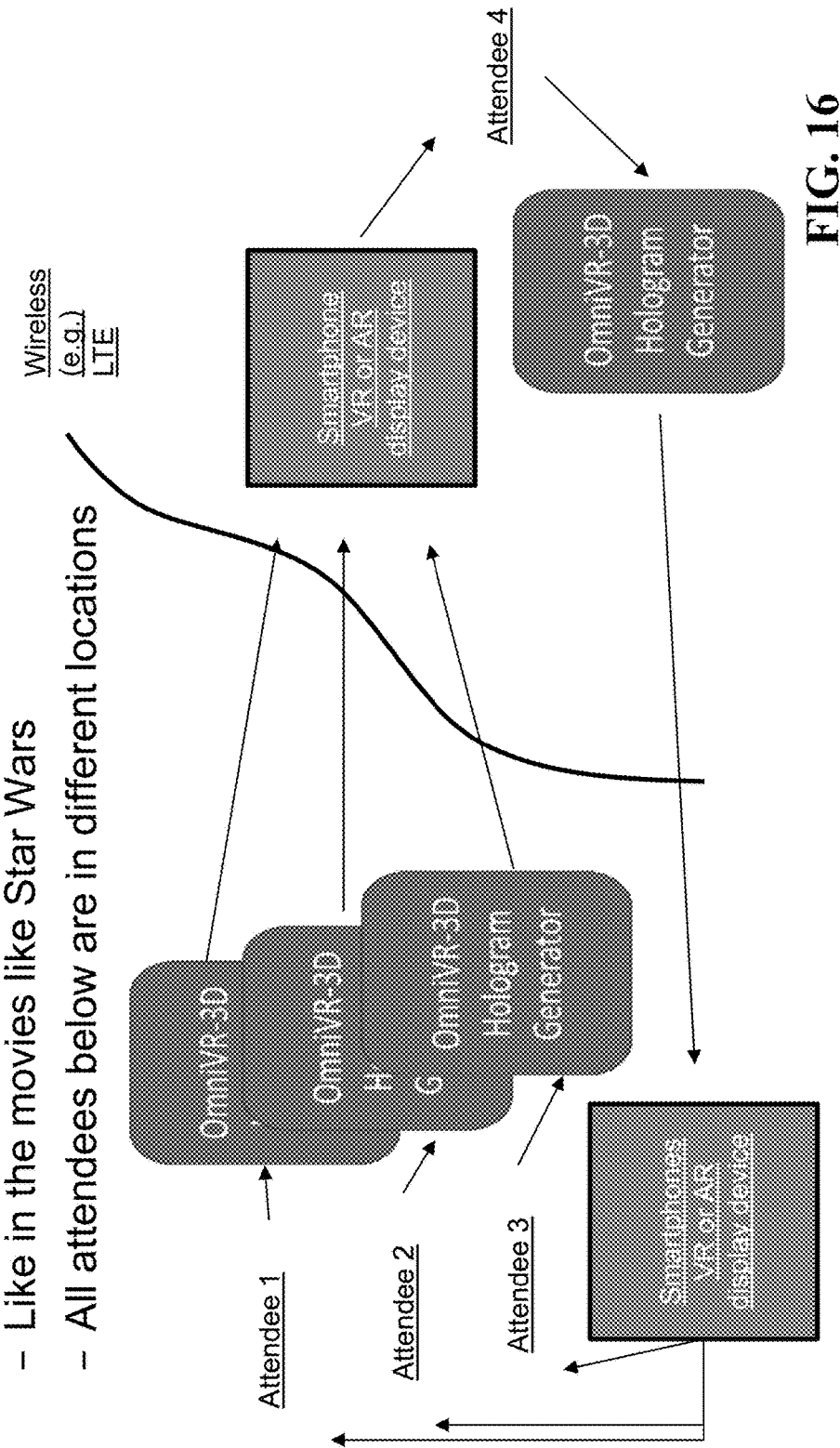

As shown in FIG. 16, the system and methods can be used in the context of virtual meetings and teleconferencing. Multiple attendees (who can be in different geographic locations) can each have a sensor and computing device that captures images and generates 3D models of each attendee, and coordinates the 3D models as described above with the computing devices of the other attendees—to provide a photo-realistic 3D experience of the meeting (like a Star Wars®-type hologram experience), as if each of the remote attendees are in the same room.

Figure 17:
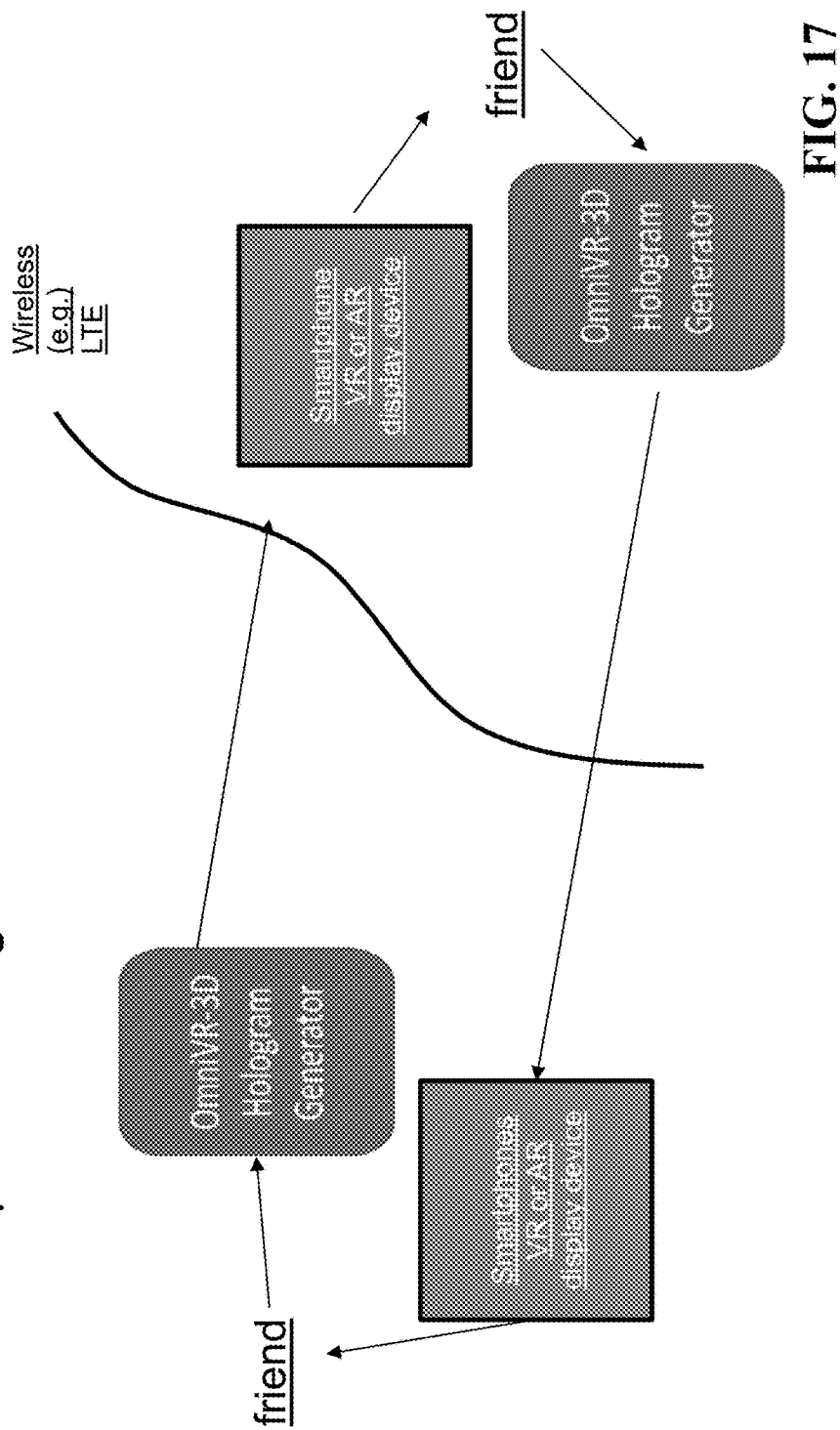
Figure 18:
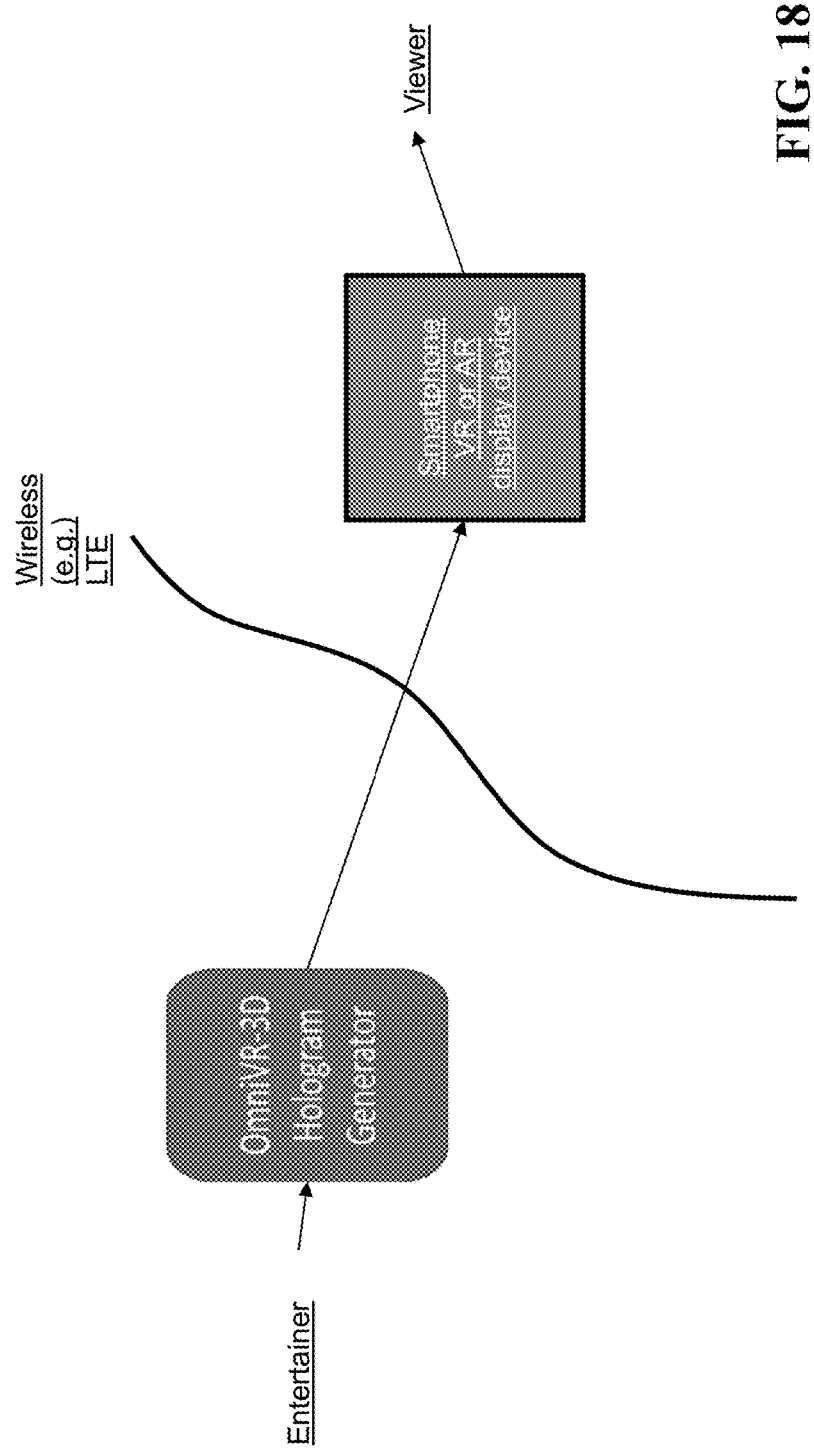

Similarly, as shown in FIG. 17, the techniques can be applied to the social media context to enable real-time 3D interactions between family members and/or friends—as if the other person is right in front of you. Likewise, in FIG. 18, the methods and systems are applicable to the entertainment field—providing immersive, lifelike, real-time 3D experiences for sporting events, concerts, and the like, even when the viewer is in a completely different location. And, as shown in FIG. 19, the techniques can be used to provide a unique virtual education experience, where the student in a remote location can experience and interact with the educator in real-time 3D.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for real-time remote avatar creation and animation control, the system comprising:
   a sensor device that captures a plurality of images of one or more non-rigid objects in a scene;
   a server computing device coupled to the sensor device, the server computing device comprising a memory that stores computer-executable instructions and a processor that executes the instructions, for each image of the plurality of images, to:
      generate an initial 3D model for each of the one or more non-rigid objects in the scene using the image;
      detect one or more landmark points on the non-rigid objects using the initial 3D model;
      generate a control point animation map for the initial 3D model using the detected landmark points, comprising:
         locating the detected landmark points in 3D space using the initial 3D model including triangulating each of the detected landmark points on the initial 3D model using a triangulation function, and
         extracting a 3D deformation for each point in the initial 3D model using the located landmark points; and
      map the control point animation map to the initial 3D model to generate a mapped 3D model; and
   a viewing device coupled to the server computing device that:
      receives, from the server computing device, (i) the mapped 3D model and (ii) tracking information associated with the one or more non-rigid objects, including a model pose and deformation of the landmark points;

modifies the mapped 3D model using the tracking information; and renders a video stream of the one or more non-rigid objects on a display element of the viewing device using the modified mapped 3D model.

2. The system of claim 1, wherein at least one of the one or more non-rigid objects in the scene is a human.

3. The system of claim 1, wherein generating an initial 3D model for each of the one or more non-rigid objects in the scene using the image comprises:

determining one or more vertices of each of the one or more non-rigid objects in the scene;

determining one or more mesh faces associated with one or more surfaces of each of the one or more non-rigid objects in the scene;

determining a surface normal for one or more surfaces of each of the one or more non-rigid objects in the scene; and generating the initial 3D model for each of the one or more non-rigid objects in the scene using the one or more vertices of the object, the one or more mesh faces of the object, and the surface normal for the one or more surfaces of the object.

4. The system of claim 1, wherein the one or more landmark points on the non-rigid objects correspond to one or more facial features of a human.

5. The system of claim 4, wherein the one or more facial features comprise a mouth, a nose, an eye, or an eyebrow.

6. The system of claim 1, wherein the triangulation function is a Delaunay triangulation.

7. The system of claim 1, wherein extracting a 3D deformation for each point in the initial 3D model using the located landmark points comprises:

projecting each point of the initial 3D model onto a plane of the image;

determining that the projected point of the initial 3D model is projected inside at least one triangle on the initial 3D model generated by the triangulation function; and approximating a 3D deformation for the projected point based upon a measured 3D deformation of one or more of the landmark points associated with the at least one triangle.

8. The system of claim 7, wherein the measured 3D deformation of one or more of the landmark points associated with the at least one triangle is weighted based upon a predetermined condition.

9. The system of claim 1, wherein the viewing device receives a timestamp corresponding to the tracking information from the server computing device.

10. The system of claim 1, wherein modifying the mapped 3D model using the tracking information comprises deforming the mapped 3D model using the tracking information to match a 3D model of the one or more non-rigid objects in the scene that is stored by the server computing device.

11. The system of claim 1, wherein the viewing device receives the mapped 3D model at a different time than the viewing device receives the tracking information.

12. The system of claim 11, wherein the viewing device periodically receives updated tracking information from the server computing device and the viewing device uses the updated tracking information to further modify the mapped 3D model.

13. The system of claim 1, wherein the server computing device inserts one or more control points in the control point animation map based upon a location of one or more of the landmark points.

14. The system of claim 1, wherein the sensor device is in a first location and the viewing device is in a second location.

15. The system of claim 14, wherein the second location is geographically remote from the first location.

16. The system of claim 1, wherein the viewing device comprises a graphics processing unit (GPU) to render the video stream.

17. The system of claim 1, wherein the video stream comprises a three-dimensional avatar of one or more of the non-rigid objects in the stream.

18. The system of claim 17, wherein an animation of the three-dimensional avatar of a non-rigid object at the viewing device is substantially synchronized with a movement of the corresponding non-rigid object in the scene as captured by the sensor device.

19. A computerized method of real-time remote avatar creation and animation control, the method comprising:

capturing, by a sensor device, a plurality of images of one or more non-rigid objects in a scene;

generating, by a server computing device coupled to the sensor device, for each image of the plurality of images, an initial 3D model for each of the one or more non-rigid objects in the scene using the image;

detecting, by the server computing device, one or more landmark points on the non-rigid objects using the initial 3D model;

generating, by the server computing device, a control point animation map for the initial 3D model using the detected landmark points, comprising:

locating the detected landmark points in 3D space using the initial 3D model including triangulating each of the detected landmark points on the initial 3D model using a triangulation function, and extracting a 3D deformation for each point in the initial 3D model using the located landmark points;

mapping, by the server computing device the control point animation map to the initial 3D model to generate a mapped 3D model;

receiving, by a viewing device from the server computing device, (i) the mapped 3D model and (ii) tracking information associated with the one or more non-rigid objects, including a model pose and deformation of the landmark points;

modifying, by the viewing device, the mapped 3D model using the tracking information; and rendering, by the viewing device, a video stream of the one or more non-rigid objects on a display element of the viewing device using the modified mapped 3D model.

20. The method of claim 19, wherein at least one of the one or more non-rigid objects in the scene is a human.

21. The method of claim 19, wherein generating an initial 3D model for each of the one or more non-rigid objects in the scene using the image comprises:

determining one or more vertices of each of the one or more non-rigid objects in the scene;

determining one or more mesh faces associated with one or more surfaces of each of the one or more non-rigid objects in the scene;

determining a surface normal for one or more surfaces of each of the one or more non-rigid objects in the scene; and generating the initial 3D model for each of the one or more non-rigid objects in the scene using the one or more vertices of the object, the one or more mesh faces of the object, and the surface normal for the one or more surfaces of the object.

22. The method of claim 19, wherein the one or more landmark points on the non-rigid objects correspond to one or more facial features of a human.

23. The method of claim 22, wherein the one or more facial features comprise a mouth, a nose, an eye, or an eyebrow.

24. The method of claim 19, wherein the triangulation function is a Delaunay triangulation.

25. The method of claim 19, wherein extracting a 3D deformation for each point in the initial 3D model using the located landmark points comprises:
    projecting each point of the initial 3D model onto a plane of the image;
    determining that the projected point of the initial 3D model is projected inside at least one triangle on the initial 3D model generated by the triangulation function; and
    approximating a 3D deformation for the projected point based upon a measured 3D deformation of one or more of the landmark points associated with the at least one triangle.

26. The method of claim 25, wherein the measured 3D deformation of one or more of the landmark points associated with the at least one triangle is weighted based upon a predetermined condition.

27. The method of claim 19, wherein the viewing device receives a timestamp corresponding to the tracking information from the server computing device.

28. The method of claim 19, wherein modifying the mapped 3D model using the tracking information comprises deforming the mapped 3D model using the tracking information to match a 3D model of the one or more non-rigid objects in the scene that is stored by the server computing device.

29. The method of claim 19, wherein the viewing device receives the mapped 3D model at a different time than the viewing device receives the tracking information.

30. The method of claim 29, wherein the viewing device periodically receives updated tracking information from the server computing device and the viewing device uses the updated tracking information to further modify the mapped 3D model.

31. The method of claim 19, further comprising inserting, by the server computing device, one or more control points in the control point animation map based upon a location of one or more of the landmark points.

32. The method of claim 19, wherein the sensor device is in a first location and the viewing device is in a second location.

33. The method of claim 32, wherein the second location is geographically remote from the first location.

34. The method of claim 19, wherein the viewing device comprises a graphics processing unit (GPU) to render the video stream.

35. The method of claim 19, wherein the video stream comprises a three-dimensional avatar of one or more of the non-rigid objects in the stream.

36. The method of claim 35, wherein an animation of the three-dimensional avatar of a non-rigid object at the viewing device is substantially synchronized with a movement of the corresponding non-rigid object in the scene as captured by the sensor device.

* * * * *